United States Patent
Nanri et al.

(10) Patent No.: US 8,903,135 B2
(45) Date of Patent: *Dec. 2, 2014

(54) STEREO IMAGE PROCESSING APPARATUS AND METHOD OF PROCESSING STEREO IMAGE

(75) Inventors: Takuya Nanri, Kanagawa (JP); Hirofumi Nishimura, Kanagawa (JP); Wenli Zhang, Beijing (CN)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/702,168

(22) PCT Filed: Jun. 30, 2011

(86) PCT No.: PCT/JP2011/003751
§ 371 (c)(1),
(2), (4) Date: Dec. 5, 2012

(87) PCT Pub. No.: WO2012/001982
PCT Pub. Date: Jan. 5, 2012

(65) Prior Publication Data
US 2013/0094713 A1 Apr. 18, 2013

(30) Foreign Application Priority Data
Jun. 30, 2010 (JP) .................................. 2010-149425

(51) Int. Cl.
| | |
|---|---|
| *H04N 7/18* | (2006.01) |
| *G06T 7/00* | (2006.01) |
| *G06K 9/78* | (2006.01) |
| *G01C 11/06* | (2006.01) |
| *G06K 9/00* | (2006.01) |

(52) U.S. Cl.
CPC ......... *G06K 9/78* (2013.01); *G06T 2207/30252* (2013.01); *G06T 7/0075* (2013.01); *G06T 7/0051* (2013.01); *G06T 2207/10012* (2013.01); *G06T 2207/30268* (2013.01); *G01C 11/06* (2013.01); *G06T 2207/30201* (2013.01); *G06T 2207/20048* (2013.01)
USPC .......................... 382/106; 382/274; 348/148

(58) Field of Classification Search
USPC ......... 382/100, 103, 106, 154–155, 162, 168, 382/173, 181, 191–194, 214, 232, 254, 274, 382/276, 291, 305, 312; 348/46, 51, 148, 348/47
See application file for complete search history.

(56) References Cited

U.S. PATENT DOCUMENTS

| | | | |
|---|---|---|---|
| 2005/0088515 A1* | 4/2005 | Geng | 348/47 |
| 2008/0253606 A1* | 10/2008 | Fujimaki et al. | 382/100 |

(Continued)

FOREIGN PATENT DOCUMENTS

| | | |
|---|---|---|
| JP | 2000-171214 A | 6/2000 |
| JP | 2008-123141 A | 5/2008 |
| WO | 2010/113389 A1 | 10/2010 |

OTHER PUBLICATIONS

International Search Report for PCT/JP2011/003751 dated Aug. 30, 2011.

*Primary Examiner* — Seyed Azarian
(74) *Attorney, Agent, or Firm* — Pearne & Gordon LLP

(57) ABSTRACT

Provided is a stereo image processing apparatus and a method of processing a stereo image, wherein calculation precision of disparity is improved, while maintaining a processing amount equal to the SAD method. In the stereo image processing apparatus (200), a data deletion unit (201) is installed in a stage prior to an image matching unit (102) and a filter unit (103), and forms a thinned-out target image and a thinned-out reference image, by thinning out a target image and a reference image. The filter unit (103) carries out filtering that uses an inverted phase filter, which is matching based on phase correlation.

6 Claims, 23 Drawing Sheets

(56) References Cited

U.S. PATENT DOCUMENTS

2009/0169052 A1* 7/2009 Seki et al. .................. 382/103
2009/0304266 A1* 12/2009 Aoki et al. .................. 382/154
2012/0026295 A1* 2/2012 Nishimura et al. ............ 348/46

* cited by examiner $$f'(m) = f(xa+m, ya) \times \frac{1}{2} \left\{ \cos(\pi \frac{m}{K-J}) + 1 \right\}$$

$$g'(m) = g(xa+n+m, ya) \times \frac{1}{2} \left\{ \cos(\pi \frac{m}{K-J}) + 1 \right\}$$

WHERE $\quad J \leq m \leq K$ $$z(m) = \sum_{k=J}^{K} f'(-k) \times g'(m-k)$$

$$f'(m) = f(xa + m, ya) \times \frac{1}{2}\left\{\cos(\pi\frac{m}{K-J}) + 1\right\}$$

$$g'(m) = g(xa + n + m, ya) \times \frac{1}{2}\left\{\cos(\pi\frac{m}{K-J}) + 1\right\}$$

WHERE $\quad J \leq m \leq K$ $$CC(n) = \sum_{i=J}^{K}\left\{f'(i) \times g'(i+n)\right\}$$

STEREO IMAGE PROCESSING APPARATUS AND METHOD OF PROCESSING STEREO IMAGE

TECHNICAL FIELD

The present invention relates to a stereo image processing apparatus and a method of processing stereo images.

A stereo image processing apparatus has been known that calculates a displacement between captured images from stereo images (i.e., a target image and a reference image) of the same object that is captured by a stereo camera, and calculates the distance to the object from the displacement.

Examples of applications under study of the stereo image processing apparatus include vehicle-mounted devices that measure the distance to a preceding vehicle, or measure the distance from an in-vehicle camera to features of a driver, such as eyes or a nose, to estimate the orientation of the face of the driver.

Recently, cameras, such as vehicle-mounted cameras and in-vehicle cameras, have got smaller. Therefore the base length of cameras (distance between cameras) of shorter, and the displacement between stereo images got smaller. It results in that the stereo image processing apparatus is required to have a function of more accurate disparity calculation.

Conventional stereo image processing apparatuses employs stereo matching methods (disparity calculation in stereo image processing methods), such as, sum of absolute differences (SAD) method or phase only correlation (POC) method.

The SAD method sums up the absolute values of differences in brightness between a first partial image cut out from a target image through a rectangular window and a second partial image cut out from a reference image through the rectangular window over the entire partial images to calculate a SAD value. The SAD value indicates the degree of difference in brightness of an image. The position of the rectangular window of the reference image is shifted every pixel in the direction of the base length of the camera, and the displacement between the position of the first partial image in the target image and the position of the second partial image in the reference image is determined as disparity at a pixel level at a minimal SAD value. Equiangular linear fitting is then performed using the minimal. SAD value and two SAD values calculated at both adjoining positions of the position giving the minimal SAD value, i.e., at the right and left positions if the base length direction of stereo cameras is horizontal, to calculate "disparity at a sub-pixel level". The displacement between the target image and the reference image is determined from the sum of the "disparity at a sub-pixel level" and the "disparity at a pixel level".

The SAD method achieves high analytical resolution with a relatively low computational complexity; however, the SAD method has a low accuracy in the calculation of disparity at a sub-pixel level. The accuracy of calculated disparity is therefore limited to about ¼ to ¹⁄₁₆ pixel.

Accordingly, in recent years the POC method has attracted attention because it achieves high-accuracy disparity calculation. The POC method achieves 2D Fourier transformation on first and second partial images cut out, for example, from a Hanning window, and combination of the resultant first and second partial images after the 2D Fourier transformation. The amplitude component of the combined image is normalized and is subject to 2D inverse Fourier transformation to determine a phase-only correlation coefficient. The amount of displacement between the images is then calculated on the basis of the correlation peak of the phase-only correlation coefficient.

The POC method (referred to as a 2D POC method) has an advantage of significantly high accuracy of disparity calculation; however, the 2D POC method requires a huge amount of disparity calculation, and it is extremely difficult to perform the arithmetic process in a short time. The 2D POC method is inferior to the SAD method with regard to analytical resolution (i.e., the size on a screen where objects having different distances from each other can be ranged distinctively).

Recently, a 1D POC method has also been proposed to reduce the computational complexity in the 2D POC method (see PL 1, for example). The 1D POC method involves 1D Fourier transformation on first and second partial images cut out, for example, from a Hanning window, and combination of the first and second partial images after the 1D Fourier transformation. The amplitude component of the combined image is normalized and is subject to 1D inverse Fourier transformation to determine a phase-only correlation coefficient. That is, the 1D Fourier transformation is employed in place of the 2D Fourier transformation to reduce the computational complexity.

CITATION LIST

Patent Literature

PTL 1
Japanese Potent Application Laid-Open No. 2008-123141

SUMMARY OF INVENTION

Technical Problem

Unfortunately, the conventional 1D POC method needs a vast amount of disparity calculation compared to the SAD method, and cannot complete the arithmetic process in a short time. In addition, the 1D POC method is inferior to the SAD method with regard to analytical resolution the size on a screen where objects having different distances from each other can be ranged distinctively).

An object of the present invention is to provide a stereo image processing apparatus and a method of processing stereo images that maintains a process load at a level equivalent to the SAT) method and improves the calculation accuracy of disparity.

Solution to Problem

A stereo image processing apparatus according to one aspect of the present invention includes: an acquiring section that acquires stereo images including a target image and a reference image; a decimating section that decimates the target image and the reference image to create a decimated target image and a decimated reference image; a first calculation section that calculates the amount of displacement in pixels between the decimated target image and the decimated reference image; a filtering section that reverses a sequence of data consisting of brightness values in the decimated target image to calculate an inverted phase filter coefficient, and filters the decimated reference image using the calculated inverted phase filter coefficient to output the result of filtering; and a second calculation section that detects a peak in the results of filtering outputted from the filtering section to calculate the amount of displacement in sub-pixels between the decimated target image and the decimated reference image.

A method of processing stereo images according to one aspect of the present invention includes the steps of: acquiring stereo images including a target image and a reference image; decimating the target image and the reference image to create a decimated target image and a decimated reference image; calculating the amount of displacement in pixels between the decimated target image and the decimated reference image; reversing a sequence of data consisting of brightness values in the decimated target image to calculate an inverted phase filter coefficient; filtering the decimated reference image using the calculated inverted phase filter coefficient; detecting a peak in the results of filtering to calculate the amount of displacement in sub-pixels between the decimated target image and the decimated reference image.

Advantageous Effects of Invention

According to the present invention, stereo image processing apparatus and a method of processing stereo images can be provided that maintains the process load at a level equivalent to the SAD method and improves the calculation accuracy of disparity.

DESCRIPTION OF EMBODIMENTS

Figure 1:
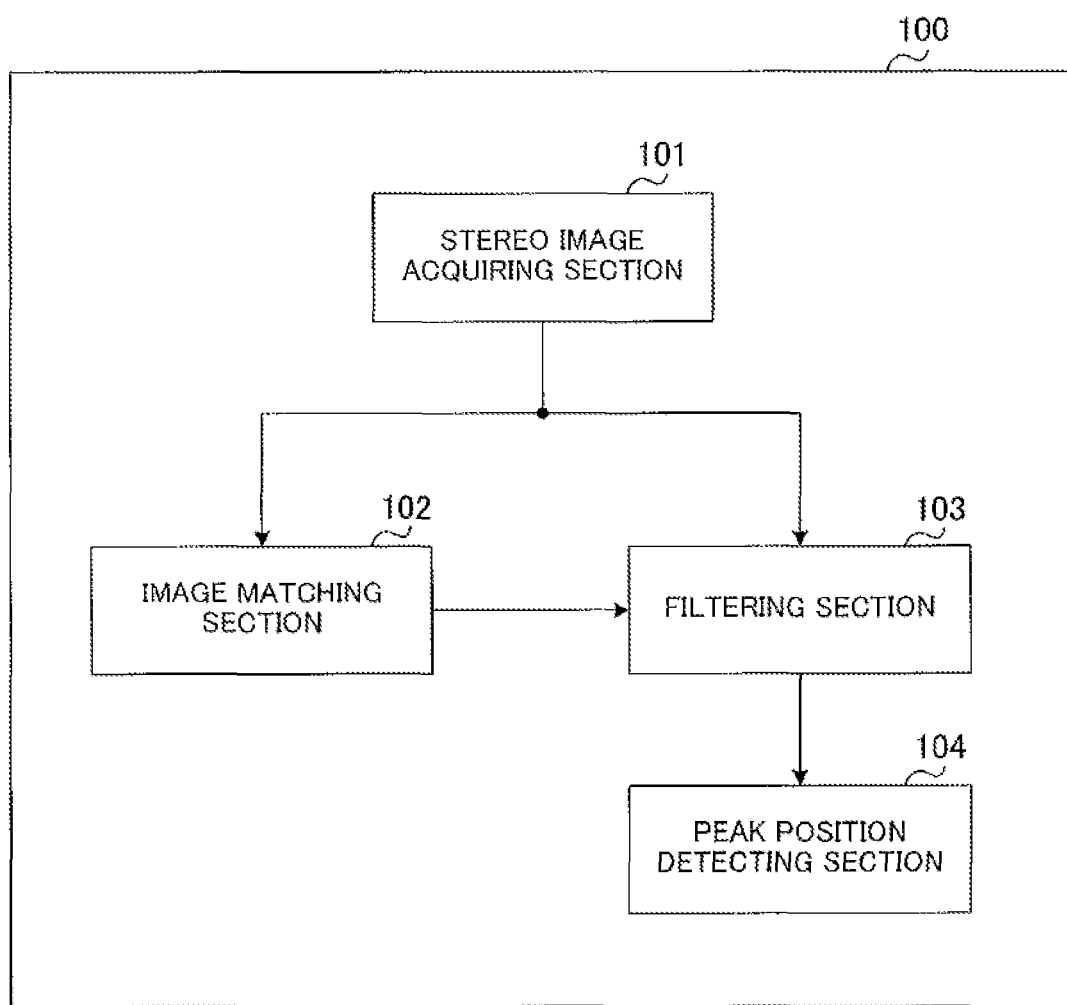
FIG. 1 is a block diagram illustrating the configuration of a stereo image processing apparatus according to Embodiment 1 of the present invention.

The embodiments of the present invention will now be described in detail with reference to the drawings. In the embodiments, the same components are denoted by the same reference numerals, without their redundant description.

(Embodiment 1)

(Configuration of Stereo Image Processing Apparatus 100)

FIG. 1 illustrates the configuration of stereo image processing apparatus 100 according to Embodiment 1 of the present invention. In FIG. 1, stereo image processing apparatus 100 includes stereo image acquiring section 101, image matching section 102, filtering section 103, and peak position detecting section 104.

(Stereo Image Acquiring Section 101)

Stereo image acquiring section 101 acquires stereo images captured by two or more imaging systems, i.e., cameras. Stereo images include a target image and a reference image on which a single object that is captured by the two different imaging systems.

(Image Matching Section 102)

Image matching section 102 per forms image matching on the basis of the target image and the reference image acquired by stereo image acquiring section 101 to calculate the "amount n of displacement" between the target image and the reference image. The unit of the amount n of displacement calculated by image matching section 102 is, for example, a pixel. On the other hand, the unit of "disparity" between the target image and the reference image obtained by peak position detecting section 104 described below is, for example, a sub-pixel. That is, image matching section 102 roughly detects the displacement between the target image and the reference image by the predetermined unit of detection, and then peak position detecting section 104 finely detects the displacement by the subunit.

Specifically, image matching section 102 defines any one pixel included in the target image as a "target point", and cuts out a partial image (referred to hereafter as a "unit target image") around the target point from the target image. Image matching section 102 also cuts out a plurality of partial images (referred to hereafter as "unit reference images") having the same size as the unit target image from different positions within the reference image. Image matching section 102 thus extracts the unit reference image having the highest degree of matching with the unit target image from the cut-out unit reference images.

A pixel corresponding to the "target point" in the extracted image is defined as a "corresponding point" on the reference image. An indicator of the degree of matching is, for example, a SAD value indicating the degree of brightness dissimilarity. Since the disparity between the target image and the reference image occurs only in the direction of a camera base length in the case of a stereo camera, cutting out the plurality of unit reference images may only need to change the trimming position in a base length direction when the plurality of unit reference images are cut out. The amount of displacement between the position of the target point in the target image and the position of the corresponding point in the reference image is calculated as the amount n of displacement.

(Filtering Section 103)

Filtering section 103 acquires the position of the target point and the amount n of displacement from image matching section 102, and stereo images from stereo image acquiring section 101.

Filtering section 103 calculates a filter coefficient on the basis of the target image, and filters the reference image using the calculated filter coefficient. That is, filtering section 103 extracts a partial image as a unit target image for estimating sub-pixels from the target image, and calculates the filter coefficient from the unit target image for estimating sub-pixels. Filtering section 103 then extracts the partial image as a unit reference image for estimating sub-pixels from the reference image, and performs filtering on the unit reference image for estimating sub-pixels using tire calculated filter coefficient to output a filtering result to peak position detecting section 104.

(Peak Position Detecting Section 104)

Peak position detecting section 104 detects a peak position in the results of filtering acquired from filtering section 103, and calculates the amount of displacement in sub-pixels between the unit target image for estimating sub-pixels and the unit reference image for estimating sub-pixels, where the results of filtering has a maximum value at the peak position. The sum of the displacement in sub-pixels and the amount n of the displacement in pixels indicate an exact amount of the displacement between the target image and the reference image.

(Operation of Stereo Image Processing Apparatus 100)

The operation of stereo image processing apparatus 100 having the configuration described above will now be explained. The following explanation is based on the assumption: the lateral direction and the longitudinal direction of an image are defined as an X-axis and a Y-axis, respectively, and one pixel is equivalent to one coordinate point.

Figure 2:
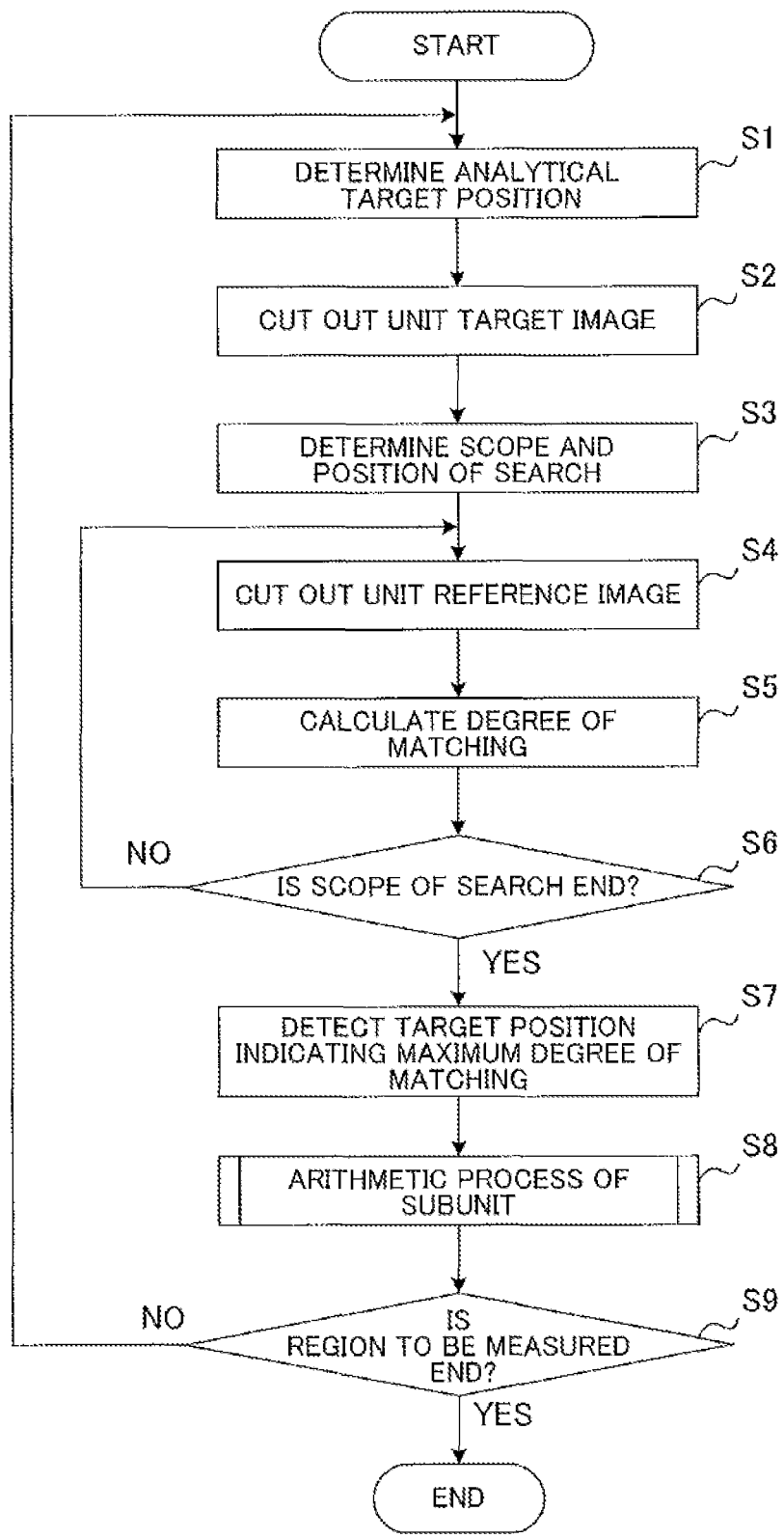
FIG. 2 is a flow chart representing the operation of the stereo image processing apparatus.

FIG. 2 is a flow chart representing the operation of stereo image processing apparatus 100. A process at any single target point in a target image is explained hereinafter; however, stereo image processing apparatus 100 calculates disparities on all pixels within a region to be ranged in the target image by shifting the target point sequentially.

(Determining an Analytical Target Position)

Image matching section 102 determines an analytical target position in step S1. The analytical target position is a coordinate point at which disparity is calculated within the target image, that is, the target point described above.

(Cutting Out a Unit Target. Image)

In step S2, image matching section 102 cuts out the partial image from the target image received from stereo image acquiring section 101 on the basis of the analytical target position determined at step S1, i.e., a unit target image. The unit size of the unit target image is a pixel, for example.

(Determining the Scope and the Starting Position of Search)

In step S3, image matching section 102 determines the scope and the starting position of search in a reference image on the basis of the analytical target position determined in step S1. The disparity in a stereo camera is determined by a base length, i.e., the distance between cameras, the focal length of a lens, and the distance from the stereo camera to an object. The scope of the search can therefore be determined on the basis of the distance from the stereo camera to the object to be ranged. Since an object at an infinite distance from the stereo camera is imaged at the same position of the target image as that of the reference image, the starting position of the search in the reference image is preferably set at the same coordinate as the target point of the target image.

(Cutting Out a Unit Reference Image)

At step S4, image matching section 102 cuts out a partial image around the starting position of the search determined in step S3 as a unit reference image from the reference image received from stereo image acquiring section 101. The unit size of the unit reference image is a pixel, for example.

(Calculating the Degree of Matching)

In step S5, image matching section 102 calculates the degree of matching between the unit target image and the unit reference image. The degree of matching is, for example, a SAD value indicating the degree of brightness dissimilarity or the degree of brightness similarity.

(Determining the End of Search Scope)

In step S6, image matching section 102 determines the end of the scope of search. When the search is determined not to reach the end of the scope (step S6: No), image matching section 102 shifts by one pixel the trimming position within the scope of the search determined at step S3, and cuts out a new unit reference image in step S4. Steps S4 to S6 are repeated until the search reaches the end of the scope.

(Position Indicating a Maximum Degree of Matching)

In step S7, image matching section 102 identifies a unit reference image with a maximum degree of matching on the basis of a plurality of degrees of matching obtained in steps S4 to S6. When the degree of brightness dissimilarity is used as the degree of matching, image matching section 102 identifies the unit reference image indicating a local minimum or minimum degree of brightness dissimilarity.

Steps S2 to S7 will now be specifically described with reference to FIG. 3.

Figure 3:
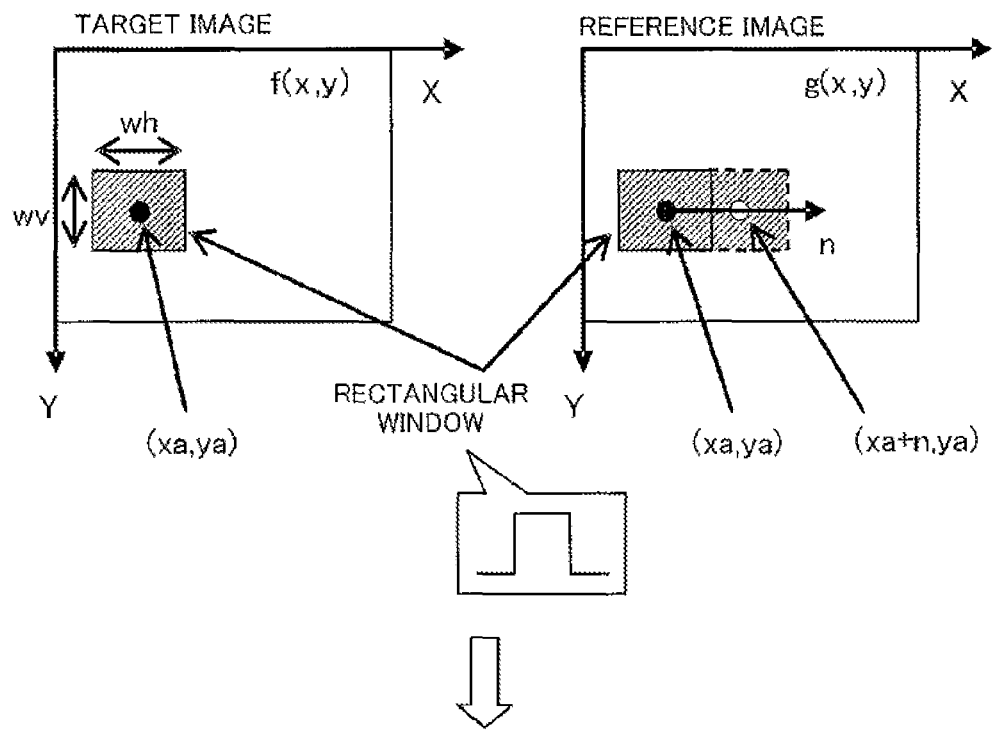
FIG. 3 illustrates the processes of an image matching section.

In step S2, as shown in FIG. 3, image matching section 102 cuts out a partial image around the analytical target position as a unit target image. The unit target image is cut out by a given size of rectangular window (longitudinal size: wv pixels, lateral size: wh pixels). The analytical target position is a target point (xa, ya) in FIG. 3.

Here, the steps will be explained assuming that the analytical target position is aligned to the center of the rectangular window defined by a window function; however, the analytical target position may not be strictly at the center of the rectangular window, and it can reside near the center.

In step S3, image matching section 102 determines the scope and the starting position of search in the reference image on the basis of the analytical target position determined in step S1. The starting position of the search (the initial coordinate for cutting out a unit reference image from the reference image) is set at, for example, the same coordinate (xa, ya) as that of the analytical target position in the target image.

Then in step S4, image matching section 102 cuts out the partial image around the starting position of search as a unit reference image from the reference image. The unit reference image is cut out by the same rectangular window as used to cut out the unit target image.

In step S5, image matching section 102 calculates the degree of matching between the unit target image and the unit reference image. The degree of matching is, for example, a SAD value indicating the degree of brightness dissimilarity. The SAD value is calculated on the basis of the following Equation (1):

[1]

$$SAD(n) = \sum_{j=ya-wv/2}^{ya+wv/2} \sum_{i=xa-wh/2}^{xa+wh/2} |f(x+i, y+j) - g(x+i+n, y+j)| \quad \text{(Equation 1)}$$

In step S6, if the search does not to reach the end of the scope, image matching section 102 shifts a trimming position and cuts out a new unit reference image from the reference image. Here, the trimming position is shifted every pixel in the direction of a right arrow extending from the coordinates (xa, ya) of the reference image shown in FIG. 3.

In such a manner, the degrees of matching between the unit target image and a plurality of unit reference images, for example SAD values, are calculated. In step S7, image matching section 102 identifies a unit reference image having the maximum degree of matching on the basis of the plurality of degrees of matching obtained in steps S4 to S6. Specifically, image matching section 102 identifies a unit reference image corresponding to, for example, the minimum SAD value among the plurality of SAD values. A specific pixel corresponding to the "target point" in the identified unit reference image is defined as a "corresponding point" on the reference image. Given that the coordinate of the corresponding point is (xa+n, ya), n is the amount of displacement in pixels.

Although the SAD value is used above as an index of the degree of matching, the present invention is not limited to this respect. Any value that can be used as an index of the degree of matching may be substituted. For example, the sum of squared differences (SSD) may be used.

(Arithmetic Process of a Subunit)

In step S8, filtering section 103 and peak position detecting section 104 perform an arithmetic process of a subunit on the basis of the corresponding point obtained at step S7 and the target image and the reference image received from stereo image acquiring section 101.

Figure 4:
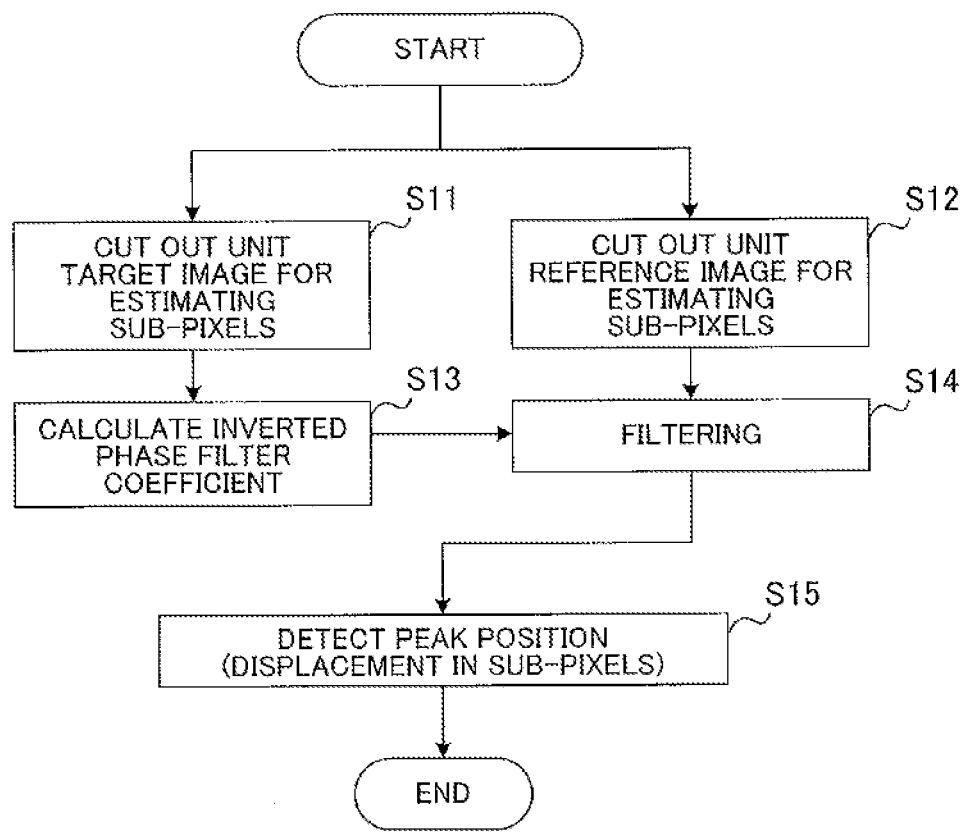
FIG. 4 is a flow chart representing the detail of a subunit arithmetic process.
Figure 5:
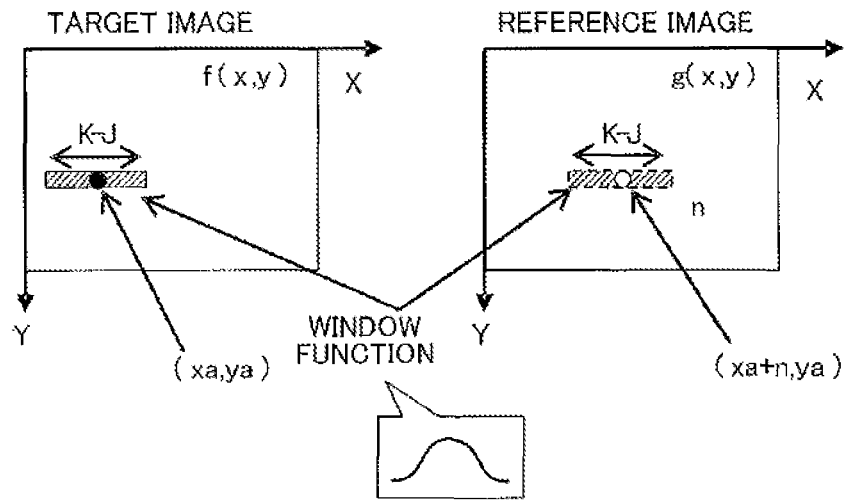
FIG. 5 illustrates the processes of a filtering section.
Figure 5:
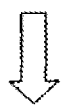

FIG. 4 is a flow chart representing the detail of a subunit arithmetic process. FIG. 5 illustrates the concept of the subunit arithmetic process.

(Cutting Out a Unit Target Image for Estimating Sub-Pixels)

In step S11, filtering section 103 cuts out a unit target image for estimating sub-pixels from the target image.

A window function is used to cut out the unit target image for estimating sub-pixels. The window function may be, for example, a Hanning window function w(m) represented by Equation (2):

[2]

$$w(m) = \frac{1}{2}\left\{\cos\left(\pi - \frac{m}{K-J}\right) + 1\right\} \quad \text{(Equation 2)}$$

Although the use of the Hanning window function is described herein, the present invention is not limited to this; for example, a Hamming window, a Blackman window, or a Kaiser window may be used as the window function. One of these window functions is selected depending on the importance of characteristics, such as frequency power characteristics, phase characteristics, and continuity of cut-out edge, of a unit target image for estimating sub-pixels. For example, the Kaiser window is selected if the phase characteristics are important; or the Hanning window is selected if a reduction in the computational complexity is important.

In a cut-out process of a unit target image for estimating sub-pixels, it is important not to include a noise in the cut-out image to determine accurate displacement in sub-pixels. Meanwhile, an image is cut out, for example, for every pixel in image matching section 102, and it is therefore important to reduce the number of arithmetic operations than to improve the accuracy. Thus a first window function used in image matching section 102 employs a window function for simply trimming image data.

In contrast, a second window function that is used to cut out images by sub-pixels is preferably a function having a continuous change at both ends of the window (i.e., a function where first and last values of a period are zeros) compared to the first window function because of the priority on less noise. Such a second window function maintains the continuity of a signal sequence of the unit target image for estimating sub-pixels, and can reduce noise components caused by trimming.

In comparison of the first window function with the second window function on frequency characteristics, the first window function has a narrower main lobe and a side lobe with a larger amplitude than those of the second function.

In FIG. 5, the second window function w(m) employs a Hanning window the size of which is one pixel on the ordinate and "K-J" pixels on the abscissa, where m is an integer of from J to K, and the second window function w(m) is centered around a target point (xa, ya). Thus, an image with dimensions of one pixel on the ordinate and "K-J" pixels on the abscissa centered around the target point (xa, ya) is cut out as the unit target image for estimating sub-pixels. In FIG. 5, f'(m) represents a sequence of brightness signals of the unit target image for estimating sub-pixels.

(Cutting Out a Unit Reference Image for Estimating Sub-Pixels)

In step S12, filtering section 103 cuts out a unit reference image for estimating sub-pixels centered on the corresponding point detected at step S7 from a reference image. A cut-out process of the unit reference image for estimating sub-pixels uses the same second function as used to cut out the unit target image for estimating sub-pixels, where the second window function is centered around a corresponding point (xa+n, ya). Thus, an image the size of which is one pixel on the ordinate and "K-J" pixels on the abscissa centered around the corresponding point (xa+n, ya) is cut out as the unit reference image for estimating sub-pixels. In FIG. 5, g'(m) represents a sequence of brightness signals of the unit reference image for estimating sub-pixels.

Although the second window function w(m) the size of which is one pixel on the ordinate and "K-J" pixels on the abscissa is explained above, this size is an example and the present invention is not limited to this. For example, a second window function the size of which is three pixels on the ordinate may be employed. In that case, the second window function cuts out a partial image the size of which is three pixels on the ordinate from each of the target image and the reference image. The average of brightnesses (i.e., average brightness) of three pixels having the same abscissa is calculated in the partial image cut out, and the unit target image or the unit reference image for estimating sub-pixels may be provided with one pixel on the ordinate with the average brightness.

If the second window function the size of which is one pixel on the ordinate is used, the second window function cuts out partial images, for example, with three lines including higher and lower lines. The average brightness value of the pixels having the same ordinate is calculated in the partial images, and the unit target image or the unit reference image for estimating sub-pixels consisting of the average brightness may be employed. The average brightness may be calculated by adding weighted values, where the weighing factor can be determined by a window function as in the ease of a 2D POC. Thus, the use of the average brightness of adjacent pixels achieves robustness against noise.

(Filter Calculation Process)

In step S13, filtering section 103 calculates an inverted phase filter coefficient on the basis of the unit target image for estimating sub-pixels. Specifically, filtering section 103 rearranges, in a reverse order (i.e., reverses), a signal sequence including brightness values arranged (i.e., a sequence of brightness signals) on the coordinates in the unit target image for estimating sub-pixels to calculate the inverted phase filter coefficient. That is, the tap length of the inverted phase filter is equal to the size on the abscissa (i.e., the window length of a window function) of the unit target image for estimating sub-pixels.

(Filtering Process)

In step S14, filtering section 103 filters the unit reference image for estimating sub-pixels using the inverted phase filter coefficient calculated at step S13, and outputs the results of filtering to peak position detecting section 104.

Figure 6:
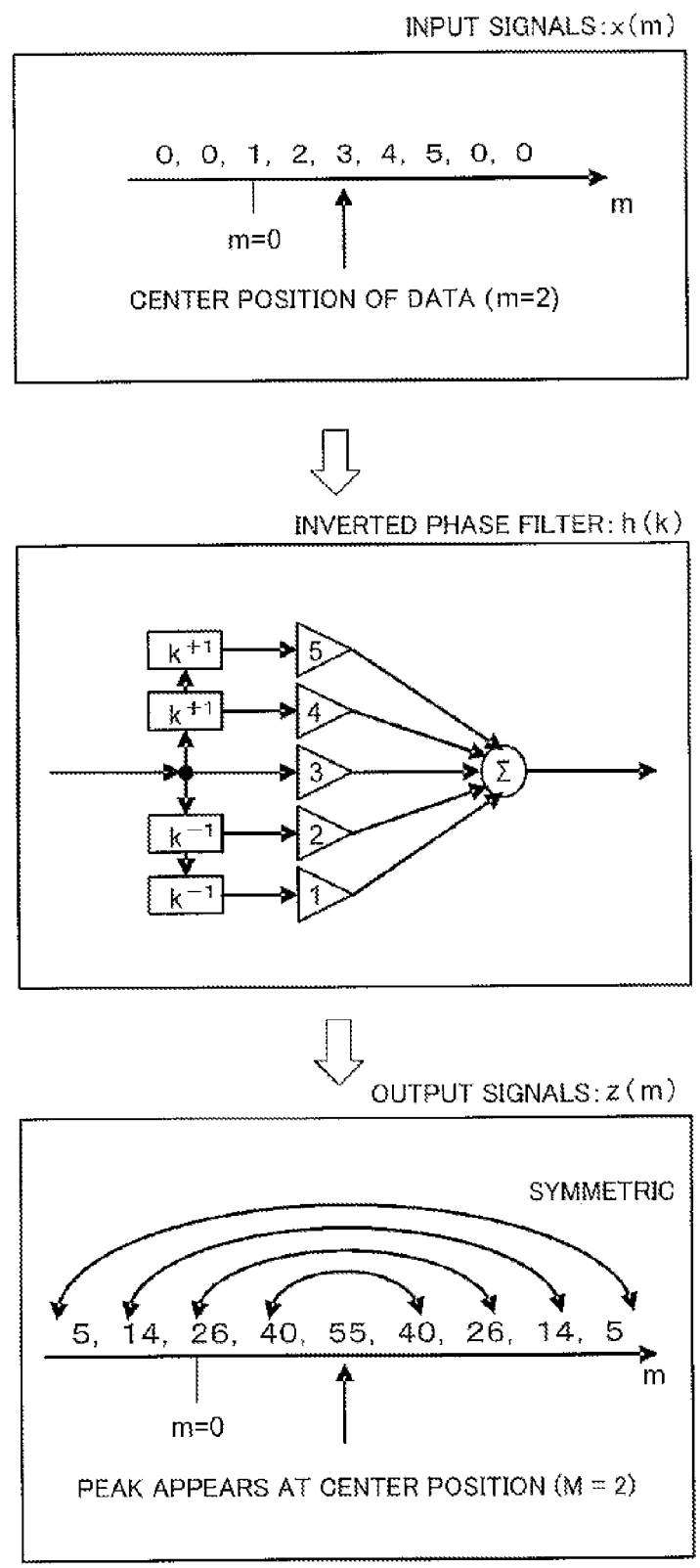
FIG. 6 illustrates a filter calculation process and a filtering process.

Here, the calculation process of the inverted phase filter coefficient and the filtering process will now be explained in detail with reference to FIG. 6. In FIG. 6, the window length (K-J) of a window function w(m) is described as being five pixels, and the sequence of brightness signals of the unit target image for estimating sub-pixels is described as being "1, 2, 3, 4, 5". The sequence x(m) of brightness signals of the unit reference image for estimating sub-pixels is "1, 2, 3, 4, 5".

If the sequence of brightness signals of the unit target image for estimating sub-pixels is "1, 2, 3, 4, 5", the inverted phase filter coefficient h(k) consisting of "5, 4, 3, 2, 1" is derived.

Filtering section 103 performs filtering on the sequence of brightness signals of the unit reference image for estimating sub-pixels using the inverted phase filter coefficient h(k).

Specifically, given that the coordinate of any configuration signal of the unit reference image for estimating sub-pixels is k, multiplication of a signal sequence having the configuration signal coordinates of "k−2, k−1, k, k+1, k+2" by the inverted phase filter coefficient h(k) gives filtering process, and the sum z(m) of the individual multiplications is calculated, where m is an integer.

If the brightness at coordinate points in the vicinity of the unit reference image for estimating sub-pixels is zero, the sequence x(m) of brightness signals of an image including each two pixels at both adjoining positions of the unit reference image for estimating sub-pixels is "0, 0, 1, 2, 3, 4, 5, 0, 0" in consideration of the brightness at the coordinate in the vicinity of the unit reference image for estimating sub-pixels. Given that m (m: 0 to 4) in FIG. 6 are coordinate points of the unit reference image for estimating sub-pixels (i.e., x(0)=1, x(1)=2, x(2)=3, x(3)=4, x(4)=5), the filtering process is performed as follows.

If m=0, the sequence of brightness signals "0, 0, 1, 2, 3" centered around m=0 is subjected to filtering using the inverted phase filter "5, 4, 3, 2, 1", and the sum z(0) is 26 (=0×1+0×2+1×3+2×4+3×5).

If m=1, the sequence of brightness signals "0, 1, 2, 3, 4" centered around in m=1 is subjected to filtering using the inverted phase filter "5, 4, 3, 2, 1", and the sum z(1) is 40 (=0×1+1×2+2×3+3×4+4×5).

Likewise, the sums z(2), z(3), and z(4) are 55, 40, and 26, respectively.

As a result, "26, 40, 55, 40, 26" is provided as the signal sequence z(m).

Such a filtering process is represented by the following Equation (3):

[3]

$$z(m) = \sum_{k=J}^{K} f'(-k) \times g'(m-k) \qquad \text{(Equation 3)}$$

In Equation (3), f'(−k) that is the reverse of the sequence of brightness signals of the unit target image for estimating sub-pixels is used as the filter coefficient h(k) of the inverted phase filter, where g'(m) indicates the brightness value of the unit reference image for estimating sub-pixels.

As shown by the signal sequence z(m), the results of filtering using the inverted phase filter are symmetric (around m=2 in FIG. 6), and the peak is present in the vicinity of the center thereof. The inverted phase filter, a type of FIR filter, is a linear shift invariant system. If a displacement present between input signals, the linear shift invariant system cause the same displacement in output signals as in the input signals. The exemplary embodiment above describes the case of no displacement between unit target image for estimating sub-pixels and the unit reference image for estimating sub-pixels. If a displacement smaller than the sampling interval is present between the unit target image for estimating sub-pixels and the unit reference image for estimating sub-pixels, the signal sequence z(m), which is the results of filtering, has the equivalent displacement.

The tap length of the inverted phase filter is determined according to the amount it of the displacement in pixels that is detected by matching in pixels. If the amount n of the displacement in pixels is small, for example, the tap length of the inverted phase filter is also set short according to that. That is, when disparities of objects of the same size are determined in a real space, the disparity of a distant object is smaller than that of a nearby object, and the amount n of the displacement in pixels of the distant object is smaller as well. At the same time, the object captured in an image is reduced in size; hence, changes in the sizes of the unit target image for estimating sub-pixels and the unit reference image for estimating sub-pixels according to the amount a of the displacement enable the tap length of the inverted phase filter to be adaptively changed, so that the disparity according to the size of the object to be ranged can be calculated.

The results of filtering, which are the outputs from the linear shift invariant system, represent a theoretical true amount of displacement except for errors caused by distortion correction of lenses, gain noise of an image sensor such as a CCD, and the accuracy of calculation to cut out images using window. Thus a true peak position can be determined in sub-pixels by interpolating a value or values between the pixels according to the sampling theorem for the output of the inverted phase filter discretized in pixels.

(Detecting a Peak Position)

In step S15, peak position detecting section 104 detects a peak position as a result of filtering. The amount of displacement in sub-pixels between the target image and the reference image can be detected on the basis of the peak position.

The peak position is detected with a sine function. The sine function, which is defined by $\sin(\pi x)/\pi x$, is used to transfer discrete sampling data hack to the original continuous data. The sampling theorem proves that a convolution operation between the sampled discrete data and the sine function can restore the complete original continuous data.

Accordingly, the convolution operation of the discrete results of filtering using the sine function enables signal data at intervals of one pixel to be interpolated, thereby detecting the true peak position of the results z(m) of filtering where signal data is theoretically interpolated even in sub-pixels.

Figure 7:
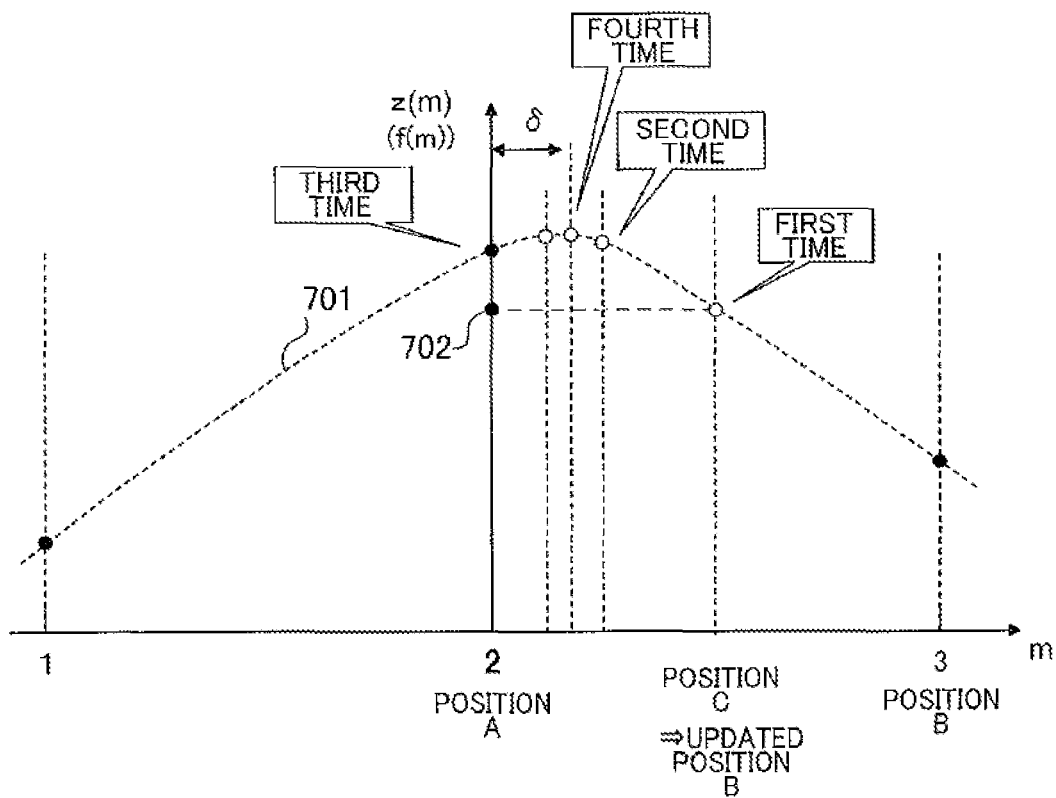
FIG. 7 illustrates the detection of a peak position with a sine function.

FIG. 7 illustrates the detection of a peak position with the sine function, where curve 701 is exemplary results of the convolution operation between the signal sequence z(m) as the results of filtering calculated in S14 and the sine function. Values between the results z(1) and z(2) and between the results z(2) and z(3) of filtering, and signal data thereof are interpolated. Peak position detecting section 104 detects the peak position of the results z(m) of filtering having the interpolated signal data through binary search.

FIG. 7 shows an example where a peak appears at m=2 in the signal sequence z(m) of the results of filtering. In such a case, peak position detecting section 104 defines m=2 as a position A (i.e., a reference point in the binary search). Peak position detecting section 104 compares z(3) with z(1) that are the results of filtering at positions shifted by one pixel to the right and left, respectively, from the position A, and defines a position (here, m=3) with a larger value as a position B (i.e., a point of use in the binary search).

Peak position detecting section 104 calculates the value 702 at a position C (m=2.5 in FIG. 7), which is a midpoint between the reference point. A in the binary search and a point B of use in the binary search, using the following Equation (4) based on the sampling theorem:

[4]

$$f(m) = \sum_{n=-\infty}^{\infty} f(nT) \frac{\sin\left(\pi\left(\frac{m}{T}-n\right)\right)}{\pi\left(\frac{m}{T}-n\right)} \quad \text{(Equation 4)}$$

Peak position detecting section 104 then defines the position C as a new reference point in the binary search, and repeats processes similar to that described above. The number of repeated processes may depend on a sub-pixel accuracy to be required. That is, the number of repetitions is determined according to the sub-pixel accuracy to be required such that if sub-pixel accuracies required are ½ pixel, ¼ pixel, and ⅛ pixel, the numbers of the above processes are 1, 2, and 3, respectively. Peak position detecting section 104 uses the midpoint determined finally as the detected peak position δ.

Although the method of detecting a peak position using the sine function and the binary search is explained above, the present invention is not limited to this embodiment. A combination of a sine function and a gradient method may be employed to search for a peak position. The point is to use any method of detecting a maximum value after signal data at intervals of one pixel is interpolated by the convolution operation of the discrete results of filtering using the sine function.

Peak position detecting section 104 may also detect a peak position by quadratic curve approximation, thereby reducing computational complexity. In the detection process of a peak position by the quadratic curve approximation, the discrete results of filtering is fitted by the quadratic curve, and the local maximum position of the quadratic curve is detected as the peak position. This enables the peak position to be determined at accuracy equal to or shorter than a discrete interval.

Figure 8:
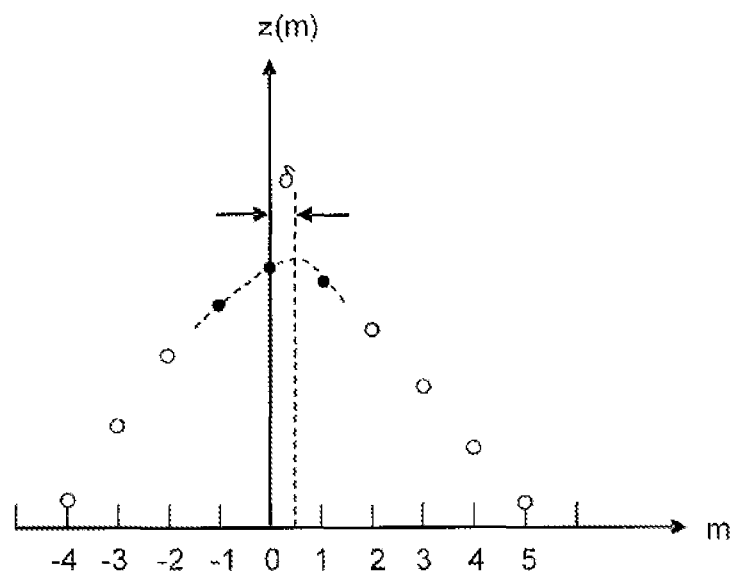
FIG. 8 illustrates the detection of a peak position by quadratic curve approximation.

FIG. 8 illustrates the peak position detection using the quadratic curve approximation. As shown FIG. 8, a quadratic curve is determined that passes through three points: a value z(0) at a position m=0 where the result z(m) of filtering at interval of one pixel is maximum, and z(+1) and z(−1) that are the results of filtering at positions shifted by one pixel to the right and left, respectively, from the position with the maximum value. The position of the local maximum of the quadratic curve is then detected as the peak position δ. The peak position δ is calculated by the following Equation (5):

[5]

$$\delta = \frac{z(-1) - z(+1)}{2 \times \{z(-1) + z(+1) - 2z(0)\}} \quad \text{(Equation 5)}$$

The disparity at the analytical target position in a target image is determined from the sum of the amount n of displacement in pixels and the amount δ of displacement in sub-pixels.

(Determining the End of a Region to be Ranged)

In step S9, the end of a region to be measured is determined. If an unprocessed region is present that is not yet subject to the processes of steps S1 to S8, steps S1 to S8 are processed within the unprocessed region by shifting the analytical target position.

In stereo image processing apparatus 100 according to the present embodiment described above, image matching section 102 calculates the amount of displacement in pixels between the target image and the reference image. Filtering section 103 reverses a sequence of data signals consisting of brightness values in the target image to calculate the inverted phase filter coefficient, and filters the reference image using the calculated filter coefficient. Then, peak position detecting section 104 detects a peak in the results of filtering, and calculates the amount of displacement in sub-pixels between the target image and the reference image. The disparity is determined from the sum of the amount of displacement in pixels and the amount of displacement in sub-pixels.

(Embodiment 2)

Embodiment 2 involves the processes in image matching section 102 and filtering section 103 after the target image and the reference image are decimated, thereby reducing the process load.

(Configuration of Stereo Image Processing Apparatus 200)

Figure 9:
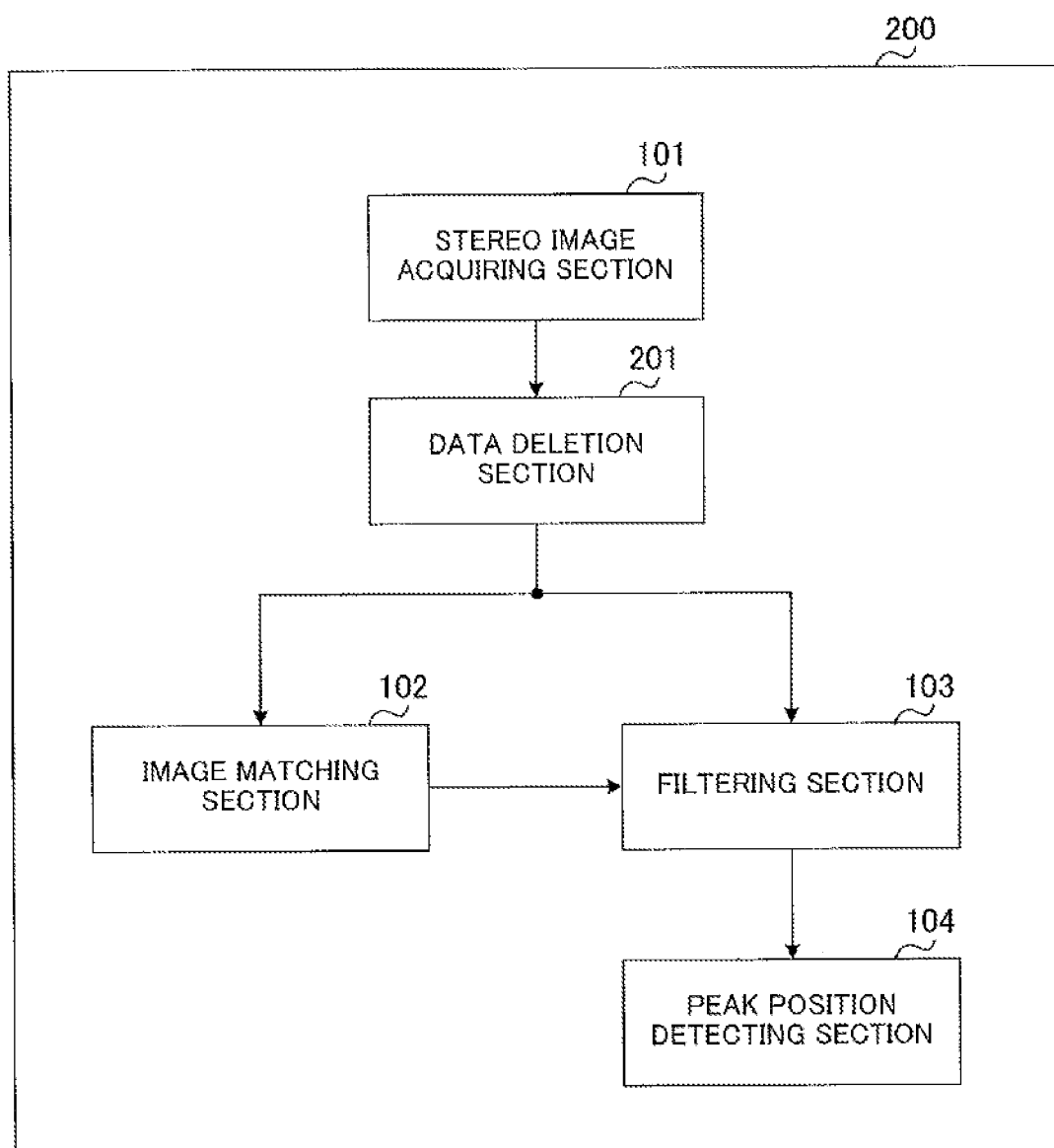
FIG. 9 is a block diagram illustrating the configuration of a stereo image processing apparatus according to Embodiment 2 of the present invention.

FIG. 9 illustrates the configuration of stereo image processing apparatus 200 according to Embodiment 2 of the present invention. In FIG. 9, stereo image processing apparatus 200 includes data deletion section 201.

Data deletion section 201 decimates image data of the target image and the reference image to create a decimated target image and a decimated reference image. Specifically, data deletion section 201 decimates the image data of the target image and the reference image by sampling at a given sampling period.

For downsampling of data signal through decimation, a low-pass filter must limit the bandwidth before the data signal is decimated such that the data signals before and after decimation have the same amount of information. That is, the original data signal is band-limited through a low-pass filter, and the band-limited data signal is then decimated to give a decimated data signal (i.e., down-sampled data signal). This allows the band-limited data signal to have a larger quantity of signals and an equal amount of information compared with data signal obtained by decimating the band-limited data.

When a camera is used, the adjustment of the focal length of a lens can remove high-bandwidth components of image data (the data signal). That is, an image is blurred (i.e., the resolution of an image is reduced) prior to the decimation of the data signal, so that the data signal before decimation can be considered as equivalent to the data signal after decimation. For example, if a VGA image with a resolution of 640× 480 is reduced to a QVGA image with a resolution of 320× 240, an image is captured by the adjusted focal length of the camera such that the resolution is halved, and the obtained image data is sampled every other pixel.

The decimated target image and the decimated reference image are outputted to image matching section 102 and filtering section 103. Thus, image matching section 102 and filtering section 103 in stereo image processing apparatus 200 processes the decimated target image and the decimated reference image.

(Operation of Stereo Image Processing Apparatus 200)

The operation of stereo image processing apparatus 200 having the configuration described above will crow be explained. Stereo image acquiring section 101 according to the present embodiment acquires a blurred image (i.e., a reduced resolution image) where high frequency components are removed by adjusting the focal length of the lens of a camera, and transfers it to data deletion section 201.

Figure 10:
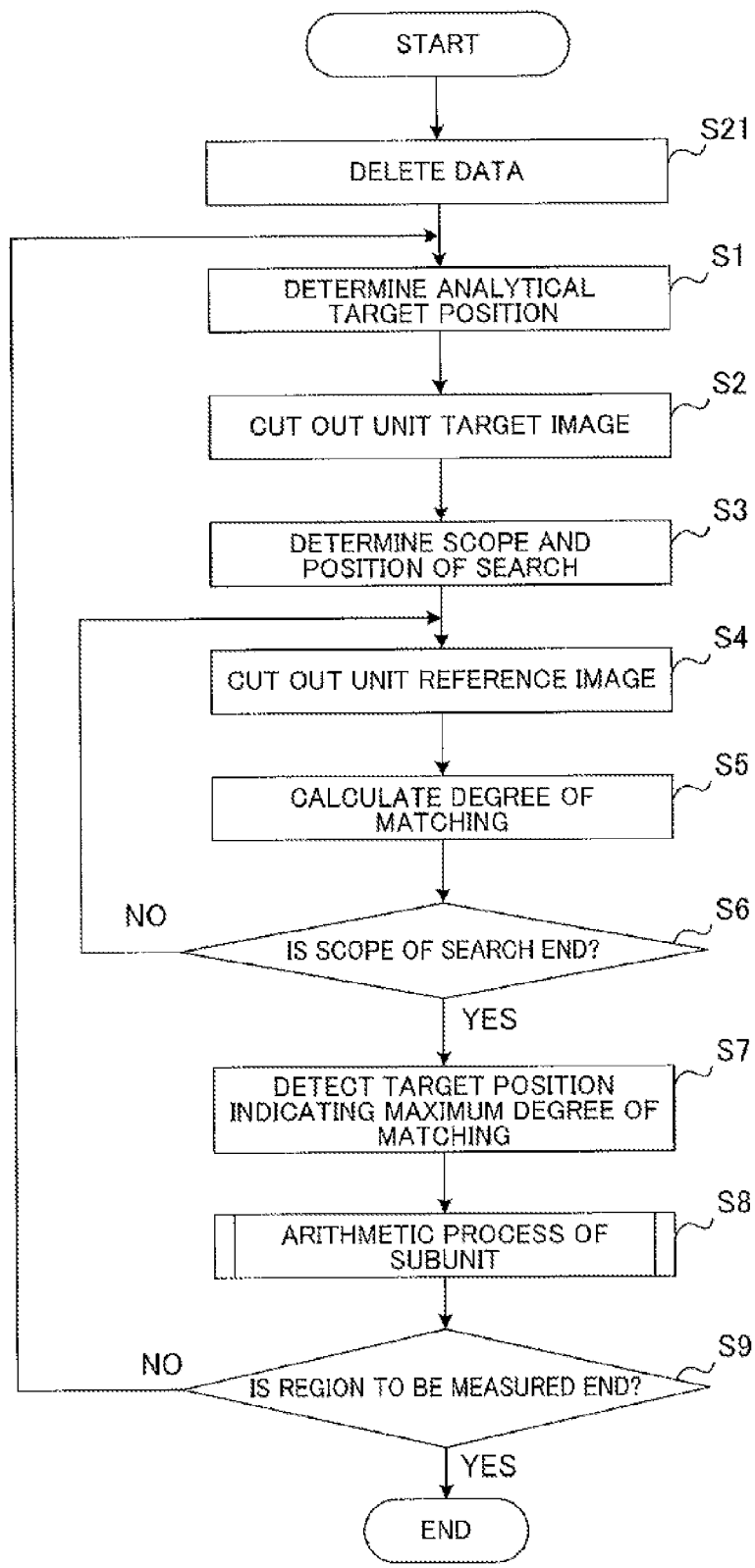
FIG. 10 is a flow chart representing the operation of the stereo image processing apparatus.

FIG. 10 is a flow chart representing the operation of stereo image processing apparatus 200.

in step S21, data deletion section 201 decimates the image data of the target image and the reference image to create the decimated target image and the decimated reference image.

Figures 11A, 11B:
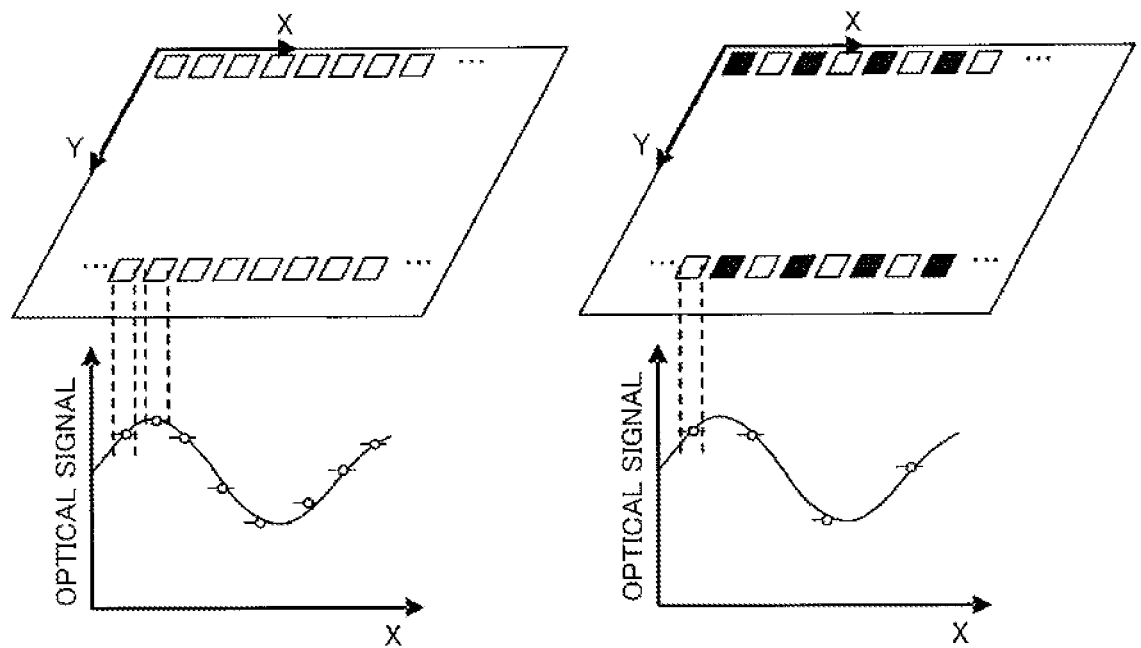
FIG. 11 shows comparison of an optical signal (image signal) obtained when no decimation process is performed with an optical signal obtained when the decimation process is performed.

FIG. 11 shows comparison of an optical signal (image signal) (FIG. 11A) obtained when no decimation process is performed with an optical signal (FIG. 11B) obtained when the decimation process is performed. XY planes shown at the upper parts of FIG. 11A and FIG. 11B are images (the target images or the reference images) that are captured at the focal length of the lens adjusted such that the resolution is halved. That is, an image indicated by the XY plane has no high frequency components of an original imago. Each of the rectangles included in the XY plane indicates a pixel.

The optical signals in FIG. 11A are acquired from pixels (i.e., all pixels) indicated by white rectangles included in the XY plane (i.e., no decimation process is performed). The optical signals in FIG. 11B are acquired from pixels (i.e., every other pixel) indicated by white rectangles included in the XY plane (i.e., the decimation process is performed). In both FIG. 11A (not decimated) and FIG. 11B (decimated), halved resolution removes high frequency components of the original image. Since pixels are sampled at regular intervals, optical signals produced in the both cases can be considered as equivalent to each other on the basis of the sampling theorem.

Even if the average of the multiple pixels (e.g. four pixels) is employed, for example, instead, of the decimation process, the amount of image data can be reduced. Since this process however is not linear, a process based on the signal processing theory is not available in the subsequent processes.

Here, a general matching process not based on the phase correlation may impair accuracy due to the effect of resolution on the pixel pitch as theoretically shown by Equation (6). For example, since the pixel pitch is doubled if the resolution is halved, the distance error is about twice regardless of disparity calculation accuracy of a matching scheme.

$$(\text{distance error}) \approx \{(\text{disparity error}) \times (\text{distance}) \times (\text{distance}) \times (\text{pixel pitch})\} / \{(\text{base length}) \times (\text{focal length})\} \quad \text{(Equation 6)}$$

In the case of matching based on the phase correlation of the present invention, even if the high frequency components of image data are removed by adjustment of the focal length of a lens, phase characteristics necessary to calculate accurate phase correlation can be obtained only from the image data in the other bands. That is, even if a decimation process decreases the amount of the image data to reduce computational complexity, the theoretical accuracy of matching can be maintained.

En stereo image processing apparatus 200 according to the present embodiment described above, data deletion section 201 is disposed upstream of image matching section 102 and filtering section 103, and decimates the image data of the target image and the reference image to create a decimated target image and a decimated reference image. Filtering section 103 performs a filtering process, which is a matching process based on the phase correlation, using an inverted phase filter.

Such a decimation process allows the matching accuracy to be maintained at a reduced amount of image data, thereby reducing the process load of image matching section 102 and filtering section 103. Additionally, since filtering section 103 performs a filtering process being the matching process based on the phase correlation using the inverted phase filter, the accuracy of the disparity calculation can be maintained even after the decimation process.

(Embodiment 3)

Embodiment 3 extracts only low frequency components through removal of high frequency components from low and high frequency components included in the image data (data signals) of the target image and the reference image, upstream of the decimation process in Embodiment 2. This prevents the deterioration of accuracy and reduces the computational complexity even if a blurred image created by adjustment of the focal length of a lens is undesirable, for example, when stereo images are applied to other uses.

(Configuration of Stereo Image Processing Apparatus 300)

Figure 12:
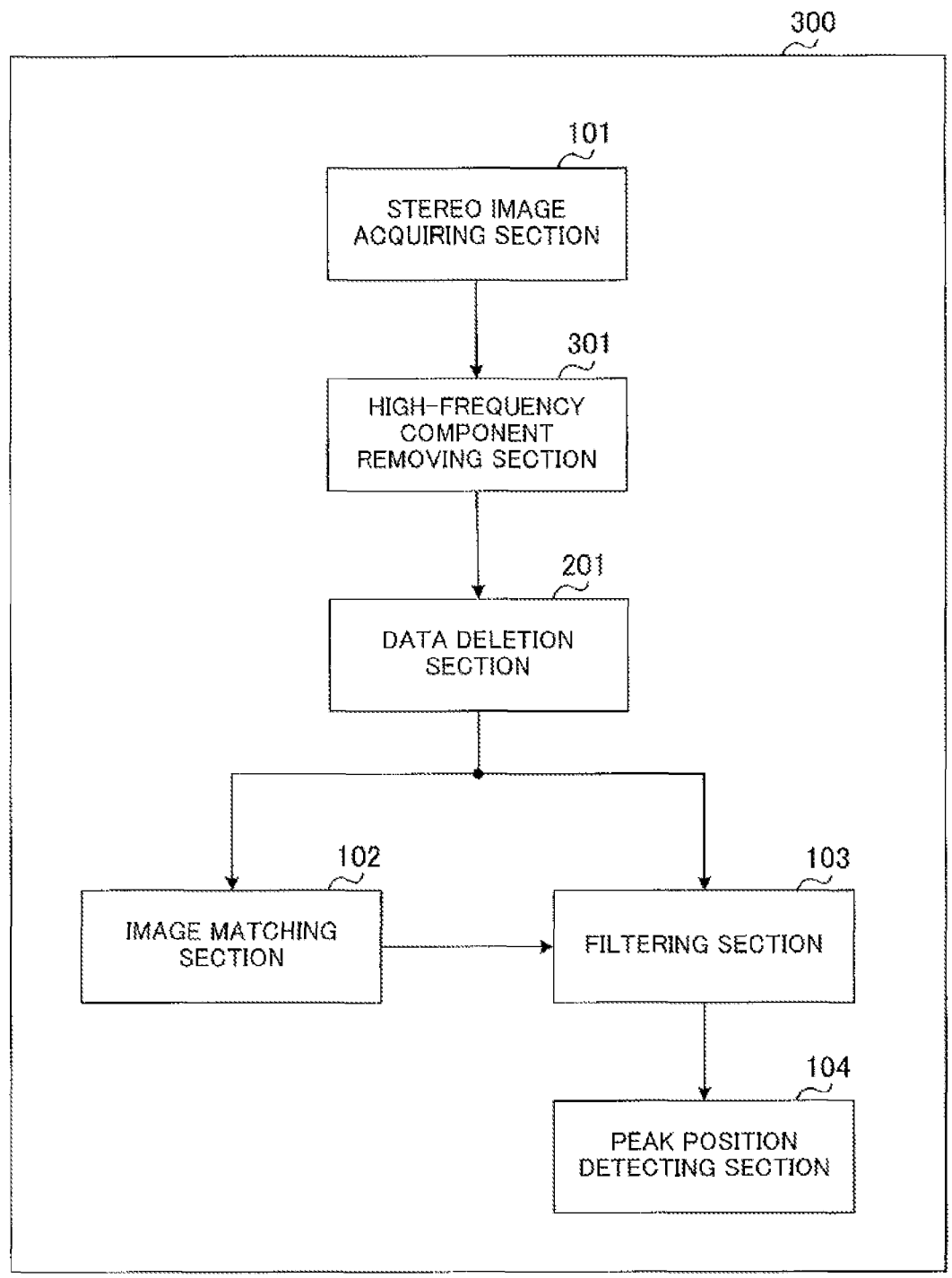
FIG. 12 is a block diagram illustrating the configuration of a stereo image processing apparatus according to Embodiment 3 of the present invention.

FIG. 12 illustrates the configuration of stereo age processing apparatus 300 according to Embodiment 3 of the present invention. In FIG. 12, stereo image processing apparatus 300 includes high-frequency component removing section 301.

High-frequency component removing section 301 extracts only low frequency components through removal of high frequency components from low and high frequency components included in the image data (data signal) of the target image and the reference image. The ter "high frequency components" refers to components having frequencies equal to or more than half of a sampling frequency of data deletion section 201. High-frequency component removing section 301 is provided with, for example, a low-frequency pass filter (i.e., a low-pass filter). This filter may be a linear filter such as an FIR filter.

(Operation of Stereo Image Processing Apparatus 300)

Figure 13:
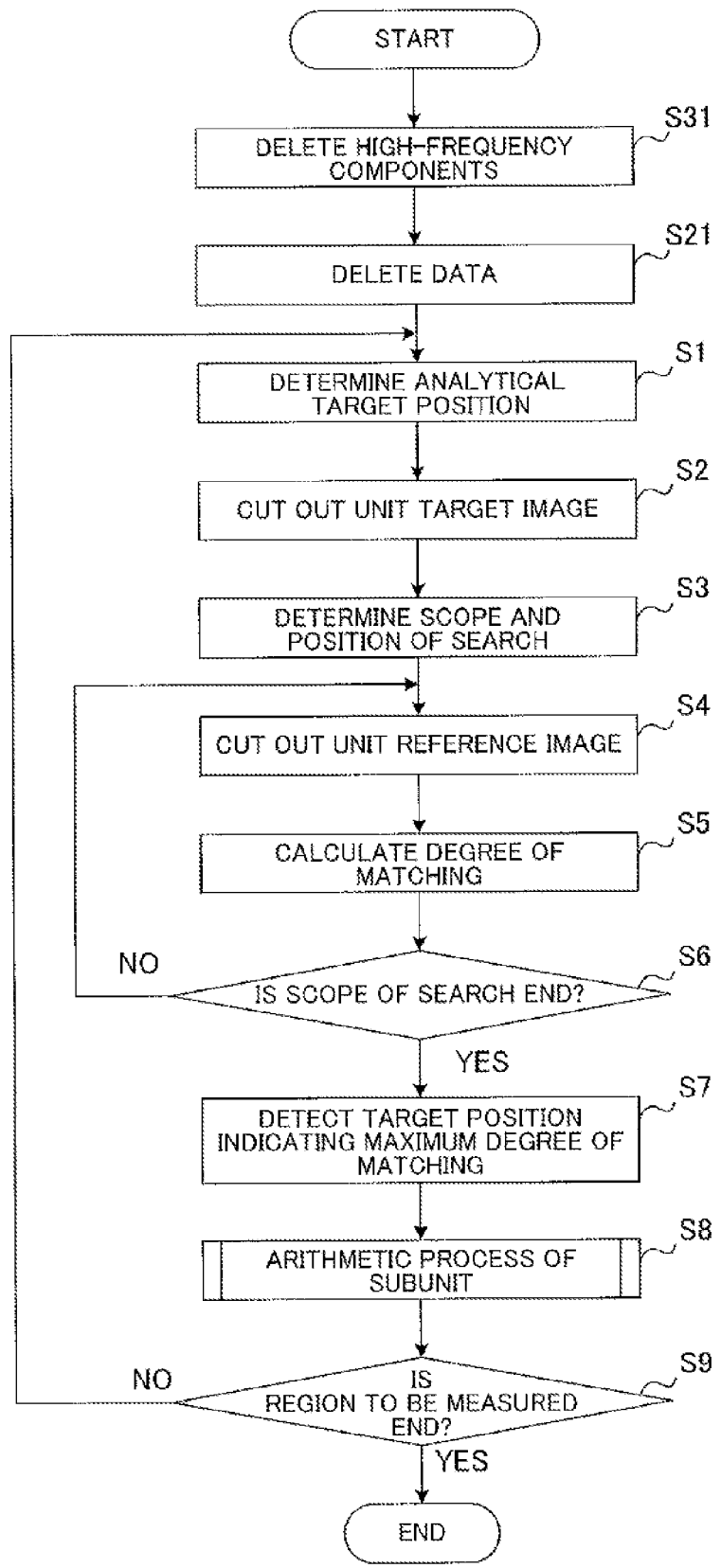
FIG. 13 is a flow chart representing the operation of the stereo image processing apparatus.

The operation of stereo image processing apparatus 300 having the configuration described above will now be explained. FIG. 13 is a flow chart representing the operation of the stereo image processing apparatus 300.

In step S31, high-frequency component removing section 301 extracts only low frequency components through removal of high frequency components from low and high frequency components included in the image data (data signal) of the target image and the reference image.

Figures 14A, 14B:
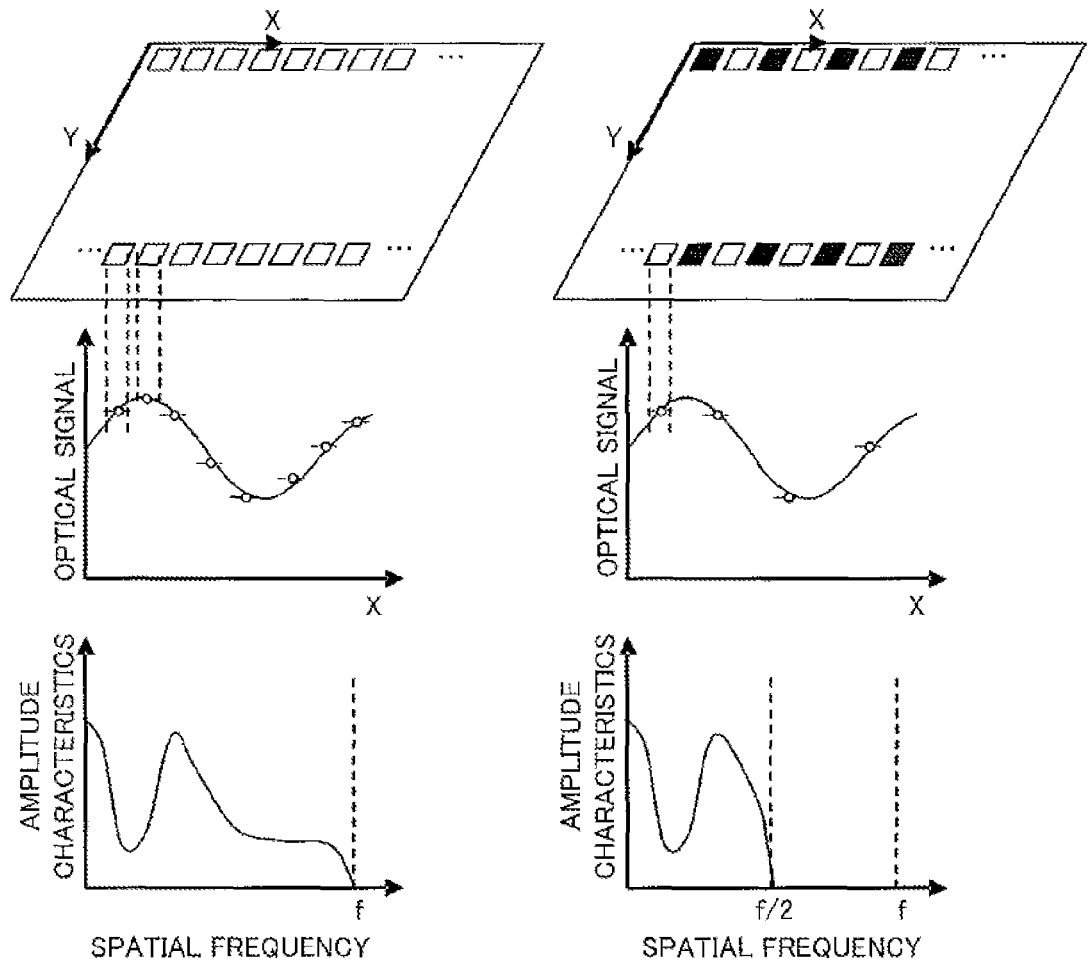
FIG. 14 shows comparison of amplitude characteristics of a spatial frequency obtained when no process to remove high-frequency components is performed with amplitude characteristics of the spatial frequency obtained when the process to remove high-frequency components is performed.

FIG. 14 shows comparison of amplitude characteristics (FIG. 14A) of spatial frequency obtained when no process for removing high-frequency components is performed with amplitude characteristics (FIG. 14B) of the spatial frequency obtained when the process for removing high-frequency components is performed. FIG. 14B indicates amplitude characteristics of the spatial frequency in the case of removal of the components with a frequency equal to or more than half of the sampling frequency of subsequent data deletion section 201. The XY plane shown at the upper part of FIG. 14A indicates image data (data signal) the high frequency components of which not removed, while the XY plane shown at the upper pad of FIG. 14B indicates image data (data signal) the high frequency components of which are removed. Subsequent processes of data deletion section 201 are the same as Embodiment 2.

Even if the linear filter removes the high frequency components of the image data, phase characteristics necessary for a matching process based on the phase correlation can be obtained only from the low frequency components, and thereby the disparity is calculated with a high accuracy. In contrast, in the case of removing no high frequency components with the linear filter, the high frequency components are superimposed on the low frequency components as folding noise upon decimation. Thus the phase characteristics of the low frequency components vary and the accuracy of the disparity is impaired as a result.

According to the present embodiment described above, stereo image processing apparatus 300 extracts only low frequency components through removal of high frequency components of frequency components included in the signals of the target image and the reference image.

Thus, the computational complexity is reduced without blurring a camera image, and the disparity can be calculated with a high accuracy.

(Embodiment 4)

In Embodiment 4, each of the target image and the reference image is provided with a plurality of channel images (e.g., R (red) channel image, G (green) channel image, and B (blue) channel image). Embodiment 4 extracts a single channel image of the plurality of channel images, or averages the different types of channel images. This achieves the same effect as the decimation in Equation 2.

(Configuration of Stereo Image Processing Apparatus 400)

Figure 15:
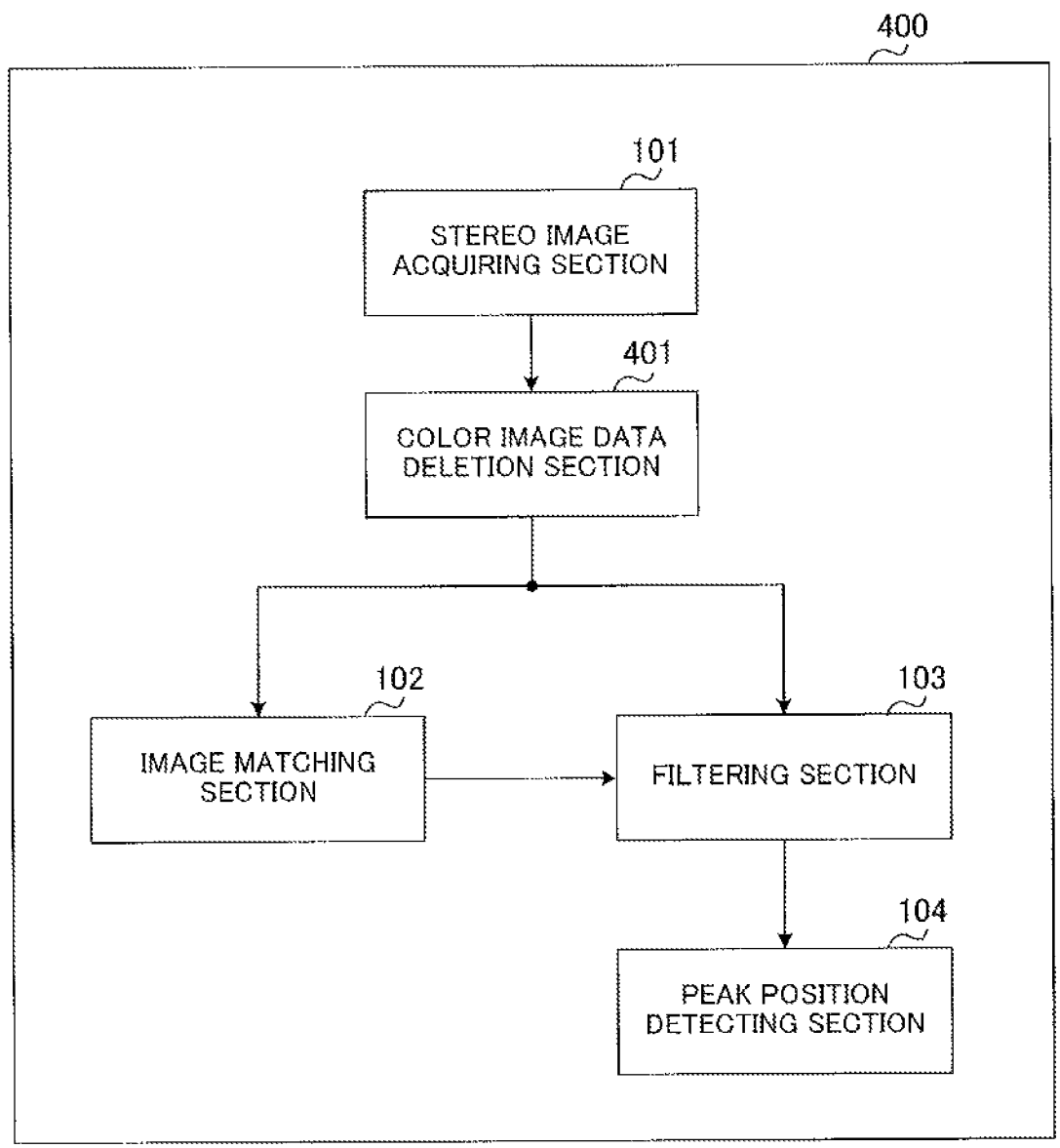
FIG. 15 is a block diagram illustrating the configuration of a stereo image processing apparatus according to Embodiment 4 of the present invention.

FIG. 15 illustrates the configuration of stereo image processing apparatus 400 according to Embodiment 4 of the present invention. In FIG. 15, stereo image processing apparatus 400 includes color image data deletion section 401.

Color image data deletion section 401 extracts only a single channel image (e.g. an R channel image) from the target image and the reference image. This allows the other channel images to be deleted, so that the process load of subsequent image matching section 102 and filtering section 103 can be reduced.

(Operation of Stereo Image Processing Apparatus 400)

Figure 16:
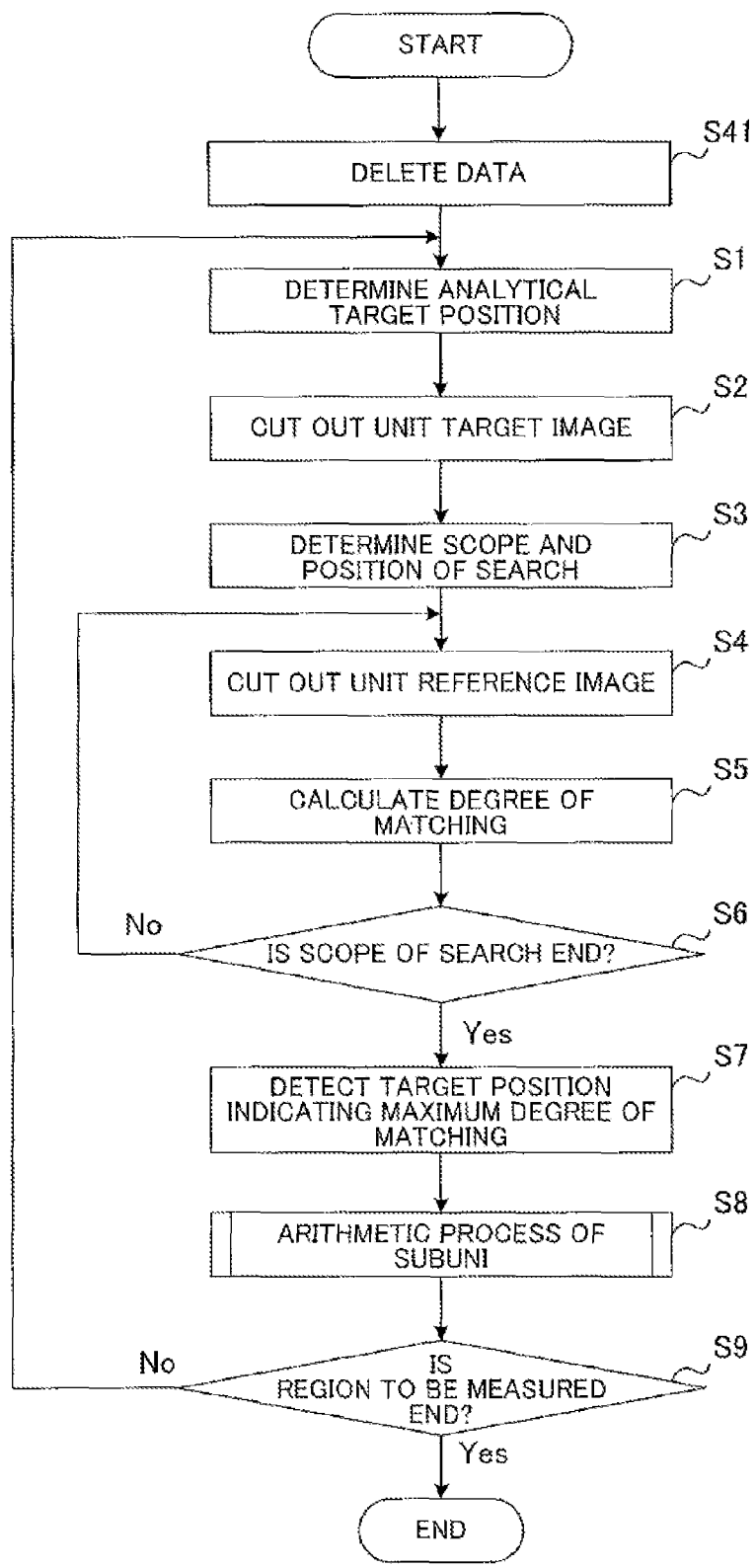
FIG. 16 is a flow chart representing the operation of the stereo image processing apparatus.

The operation of stereo image processing apparatus 400 having the configuration described above will now be explained. FIG. 16 is a flow chart representing the operation of stereo image processing apparatus 400.

In step S41, color image data deletion section 401 extracts only a single channel image from the target image and the reference image.

Figure 17:
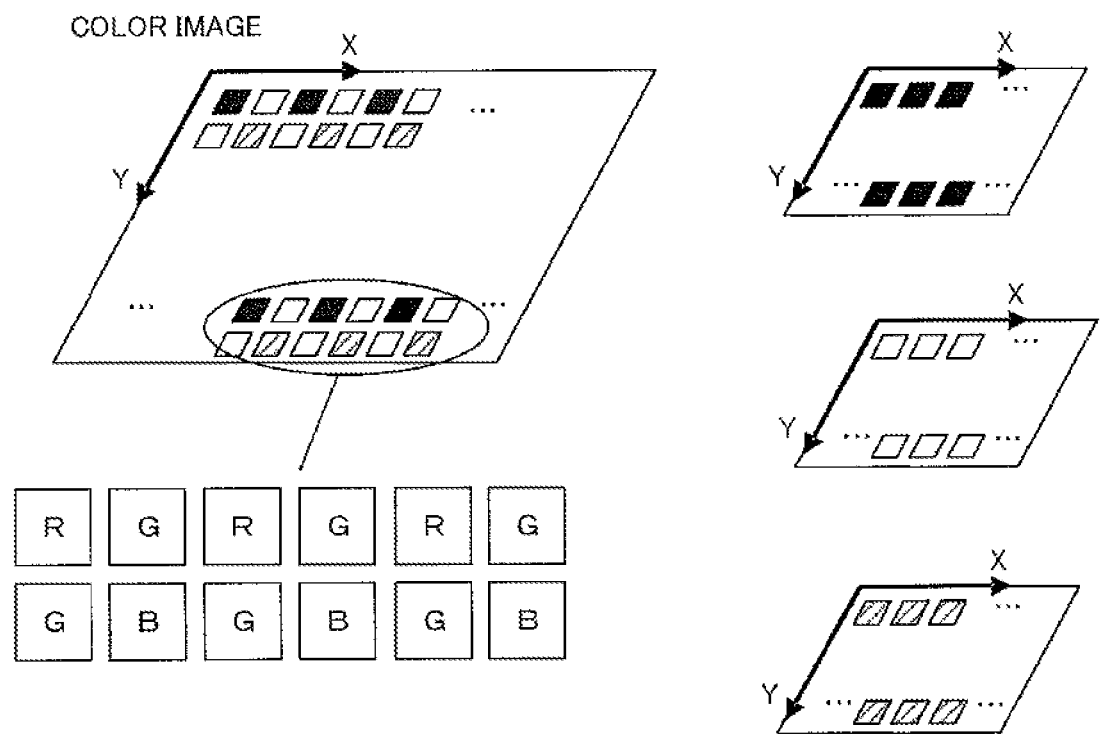
FIG. 17 illustrates a Bayer array image created with a color filter.

FIG. 17 illustrates a Bayer array image created with a color filter. As shown in FIG. 17, the Bayer array image includes an R pixel, a G pixel, another G pixel, and a B pixel as one structural unit (i.e., one color pixel unit). Color image data deletion section 401 extracts only the R channel images from the image data of the target image and the image data of the reference image. The R pixels are arranged, every other pixel in the Bayer array image, so that extraction of an optical signal (image signal) for the R channel image only is equivalent to the decimation of the image data of the target image and the reference image.

Figure 18:
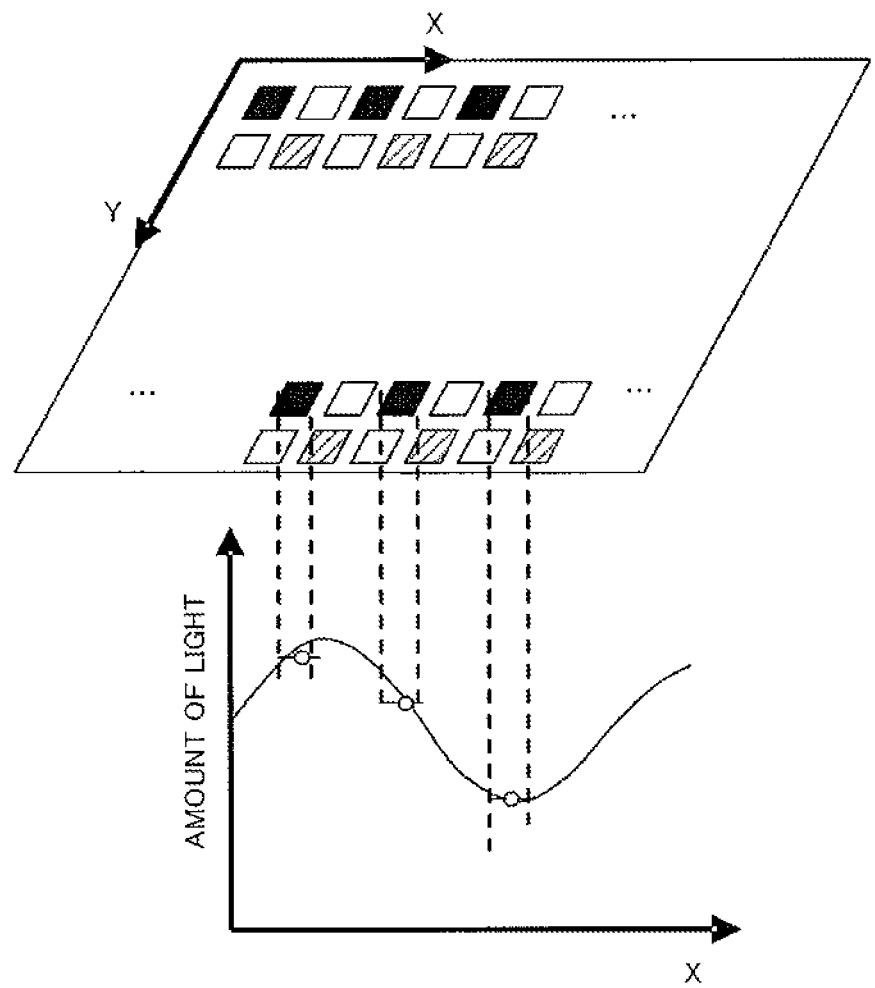
FIG. 18 illustrates an optical signal (image signal) for an R channel image only.

FIG. 18 illustrates the extraction of the R channel image only, and the process has the same effect as that in FIG. 14.

In stereo image processing apparatus 400 according to the present embodiment described above, each of the target image and the reference image is provided with a plurality of channel images, and color image data deletion section 401 extracts only a single channel image from the plurality of channel images of the target image and the reference image to create a decimated target image and a decimated reference image. As a result, the amount of the image data can be reduced, and thereby image matching section 102 and filtering section 103 can reduce the process load thereof.

Filtering section 103 performs filtering using an inverted phase filter as a matching process based on phase correlation. The phase characteristics sufficient to maintain the matching accuracy based on the phase correlation can be achieved only from the single channel image. Thus the accuracy of the disparity calculation, can be also maintained even after the decimation process described above.

As the disparity is calculated in the direction of a base length, the summation of brightness signals of pixels arranged perpendicular to the direction of the base length can also improve the signal-to-noise ratio. For example, a horizontal direction is defined as the direction of the base length for color stereo images captured by cameras aligned horizontally; hence, the summation of brightness signals of pixels aligned vertically can improve the signal-to-noise ratio. That is, taking the color pixel unit described above for an example, the summation of pixel values at the R pixel and the G pixel under the R pixel can improve the accuracy of the disparity calculation. Note that, when brightness signals of pixels arranged perpendicular to the direction of the base length are summed, pixel values of pixels having the same wavelength may be summed.

Furthermore, since an object for which the disparity is calculated may have a plane that is present in approximately the same distance from the cameras, the summation of pixels arranged in the direction of the base length can also improve the signal-to-noise ratio. For example, the horizontal direction is defined as the direction of the base length for the color stereo images captured by cameras aligned horizontally; hence, the summation of brightness signals of pixels aligned horizontally can improve the signal-to-noise ratio. That is, taking the color pixel unit described above for an example, the summation of pixel values at the R pixel and the G pixel horizontally adjacent to the R pixel can improve the accuracy of the disparity calculation. However, no summation of the pixels that have different horizontal coordinates (X coordinates) and the same wavelength is made. This is because that is equivalent to sampling with two consecutive pixels being averaged rather than with an optical signal being sampled at an interval of every other pixel, and the frequency characteristics of the optical signal cannot be maintained. For example, the R (red), the G (green), and the G (green) of the Bayer array are not summed.

The Bayer array described above is an example and the present invention should not be limited to this example.

(Embodiment 5)

In Embodiment 5, likewise in Embodiment 4, each of the target image and the reference image is provided with a plurality of channel images (e.g., R (red) channel image, G (green) channel image, and B (blue) channel image). In Embodiment 5, four pixels of an R pixel, a first G pixel, a second pixel and a B pixel included in the color pixel unit are classified into a first pixel group consisting of the R pixel, the first G pixel, and the B pixel, and a second pixel group consisting of the second G pixel, and brightness values are linearly combined in the first pixel group.

Figure 19:
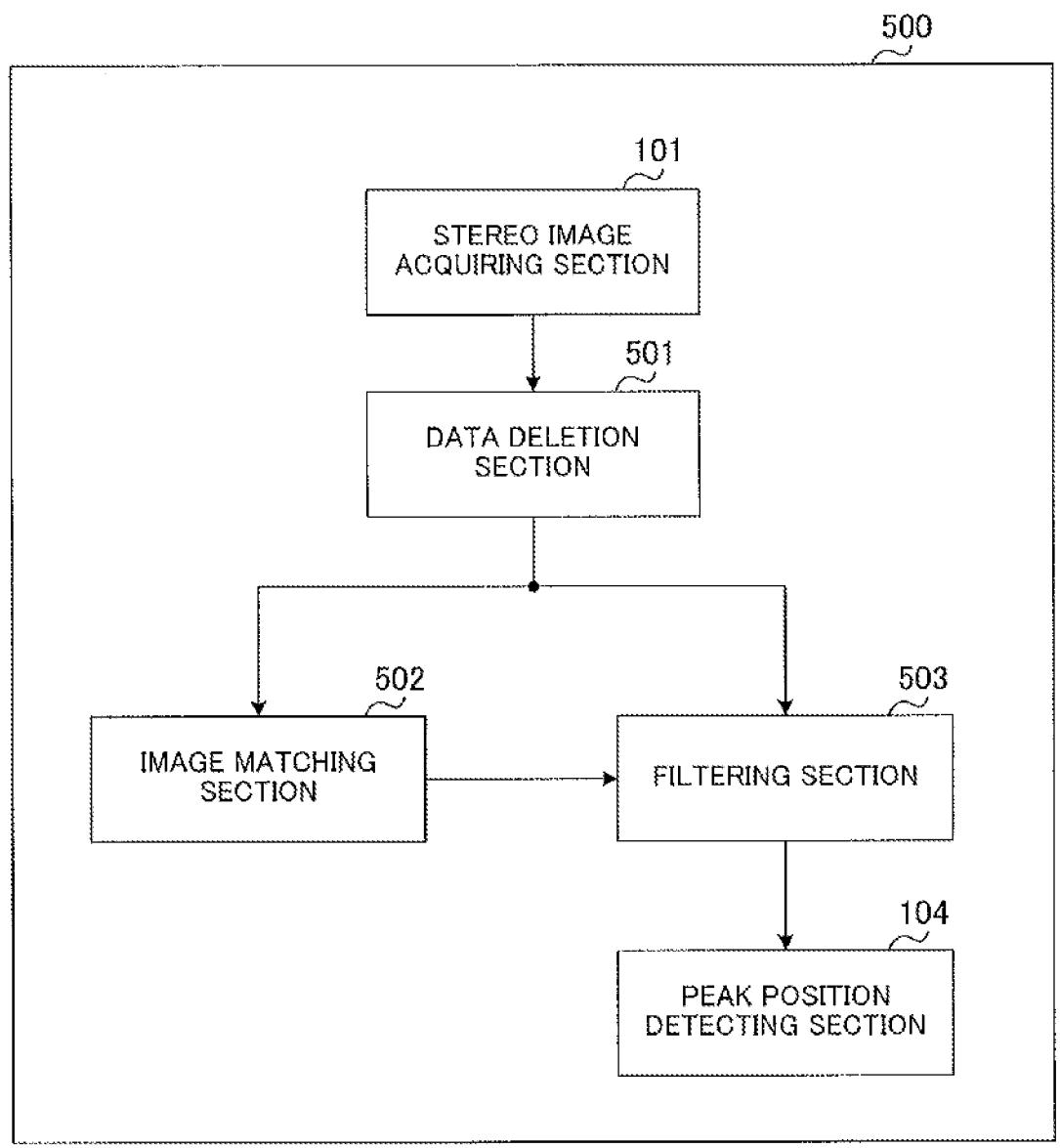
FIG. 19 is a block diagram illustrating the configuration of a stereo image processing apparatus according to Embodiment 5 of the present invention.

FIG. 19 illustrates the configuration of stereo image processing apparatus 500 according to Embodiment 5 of the present invention. In FIG. 19, stereo image processing apparatus 500 includes data deletion section 501, image matching section 502, and filtering section 503.

Data deletion section 501 linearly combines the brightness values in the first pixel group of the two pixel groups from the pixels included in the color pixel unit, to create a single composite channel image. The composite channel image is created from each of the target image and the reference image. Namely, a composite channel target image and a composite channel reference image are created.

If the color pixel unit includes four pixels of the R pixel, the first G pixel, the second G pixel and the B pixel, the first pixel group consists of the R pixel, the first G pixel and the B pixel, while the second pixel group consists of the second G pixel. In this manner, four brightness values of respective configuration pixels of the color pixel unit are reduced to two brightness values. That is, in this embodiment, both of the composite channel target, image and the target image of the second pixel group correspond to the decimated target image, and both of the composite channel reference image and the reference image of the second pixel group correspond to the decimated reference image.

Image matching section 502 basically has the same function as image matching section 102. Image matching section 502, which processes the composite channel target image and the composite channel reference image, performs matching on the basis of the composite channel target image and the composite channel reference image. Image matching section 502 outputs the target point and the "amount n of displacement" as the results of matching to filtering section 503. Image matching section 502 processes neither the target image of the second pixel group nor the reference image of the second pixel group.

Filtering section 503 calculates a first filter coefficient on the basis of the composite channel target image for the first pixel group of the target image, and calculates a second filter coefficient on the basis of the image of the second pixel group of the target image.

Filtering section 503 filters the composite channel reference image using the first filter coefficient to obtain a first filtering result. Filtering section 503 filters the image of the second image group of the reference image using the second filter coefficient to obtain a second filtering result. Filtering section 503 sums the first filtering result and the second filtering result to obtain a final filtering result. The final filtering result is outputted to peak position detecting section 104.

Thus, this embodiment detects a peak position using the final filtering result that is the sum of the first: filtering result and the second filtering result, thereby improving the accuracy of peak detection.

(Embodiment 6)

Embodiment 6 involves a cross-correlation process in place of the filter calculation process and the filtering process.

(Configuration of Stereo Image Processing Apparatus 600)

Figure 20:
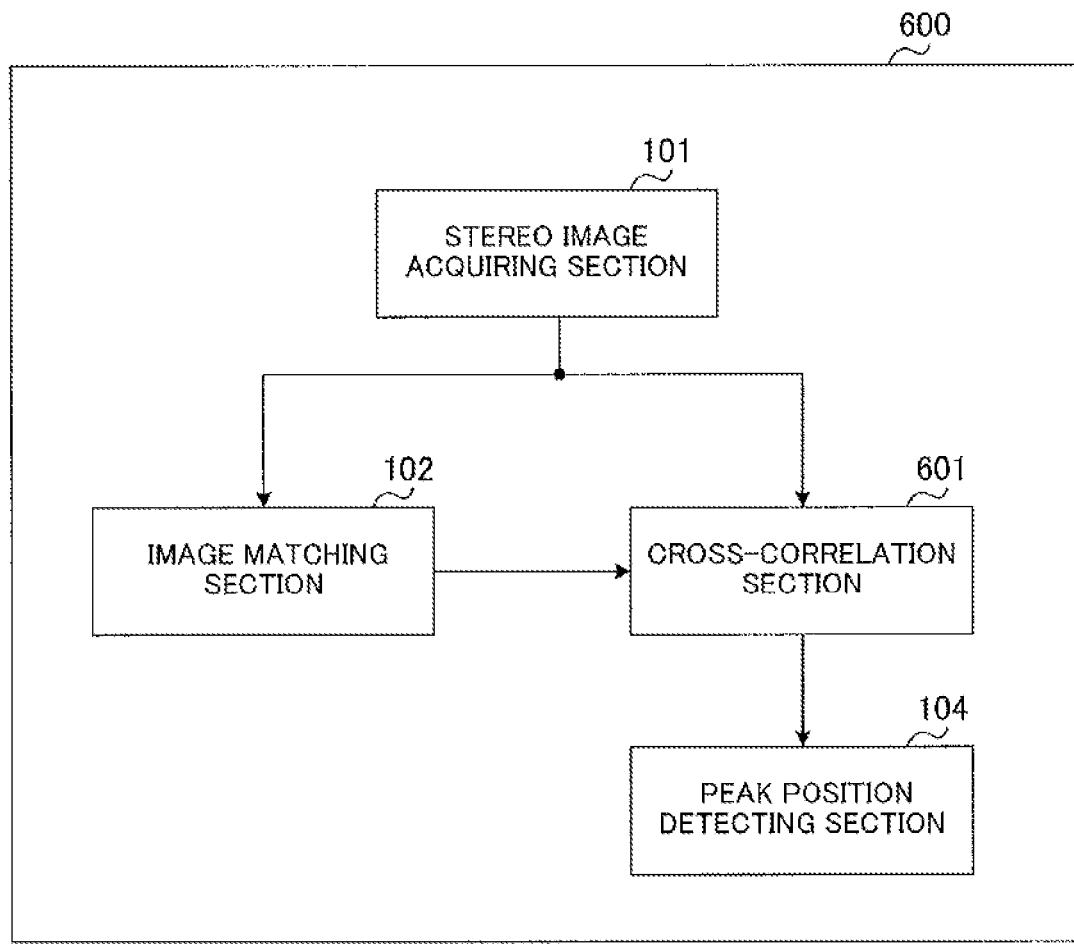
FIG. 20 is a block diagram illustrating the configuration of a stereo image processing apparatus according to Embodiment 6 of the present in cation.

FIG. 20 illustrates the configuration of stereo image processing apparatus 600 according to Embodiment 6 of the present invention. In FIG. 20, stereo image processing apparatus 600 includes cross-correlation section 601.

Like filtering section 103, cross-correlation section 601 cuts out the unit reference image for estimating sub-pixels from the unit reference image based on a corresponding point. Cross-correlation section 601 calculates the cross-correlation between the unit target image for estimating sub-pixels and the unit reference image for estimating sub-pixels.

(Operation of Stereo Image Processing Apparatus 600)

Figure 21:
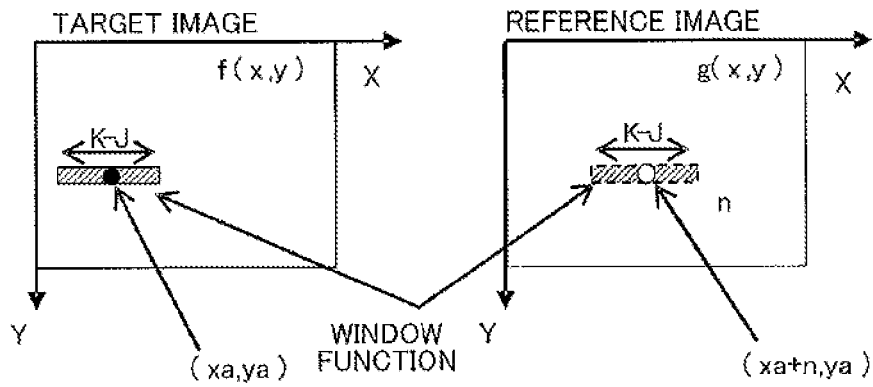
FIG. 21 illustrates a cross-correlation process.
Figure 21:
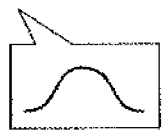
Figure 21:
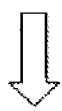

The operation of stereo image processing apparatus 600 having the configuration described above will now be explained. FIG. 21 illustrates the cross-correlation process.

Cross-correlation section 601 cuts out the unit reference image for estimating sub-pixels from the unit reference image based on the corresponding point. A cut-out process of the unit reference image for estimating sub-pixels also uses the same second window function as used to cut out the unit target image for estimating sub-pixels, where the second window function is determined on the basis of a corresponding point (xa+n, ya). Thus, an image the size of which is one pixel on the ordinate and "K-J" pixels on the abscissa centered on the corresponding point (xa+n, ya) is cut out as the unit: reference image for estimating sub-pixels.

Cross-correlation section 601 calculates the cross-correlation between the unit target image for estimating sub-pixels and the unit reference image for estimating sub-pixels. The cross-correlation is calculated by the following Equation (7):

[7]
$$CC(n) = \sum_{j=ya-wv/2}^{ya+wv/2} \sum_{i=xa-wh/2}^{xa+wh/2} \{f'(x+i, y+j) \times g'(x+i+n, y+j)\} \quad \text{(Equation 7)}$$

Replacement of i with −k in Equation (7) equalizes the content of Σ to Equation (3), and the range of summation in Σ is from −J to −k, where J and K indicate the range of the window function centered on zero, and have reverse signs. Thus basically, the order of addition is only different between the equations, and the calculated results are equivalent to Equation (3). That is, the calculation with the inverted phase filter can be replaced with the cross-correlation calculation. Accordingly, like the use of the inverted phase filter, the use of the cross-correlation can perform matching at a sub-pixel level with a high accuracy.

Figure 22:
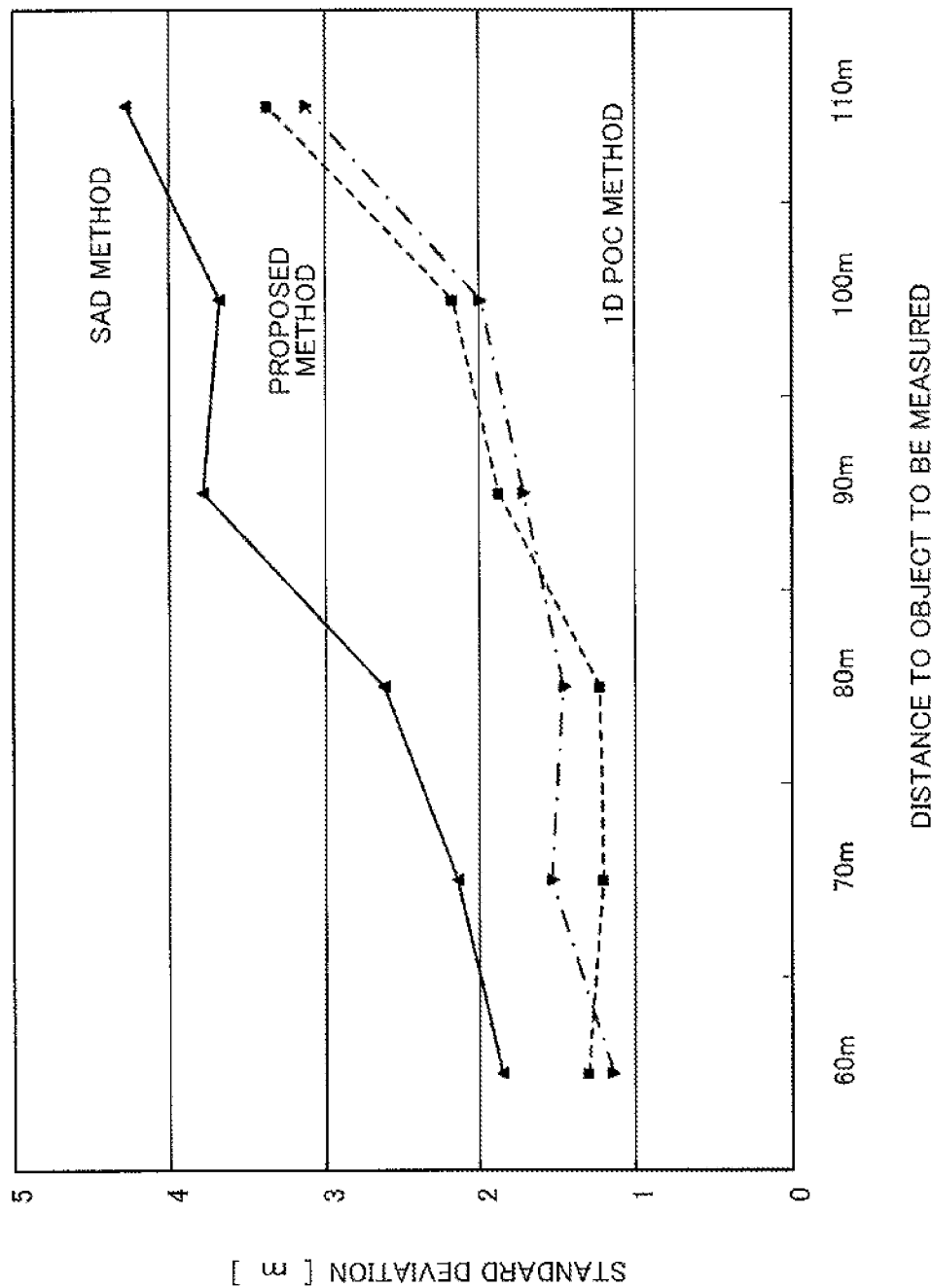
FIG. 22 shows comparison of accuracies of ranging between a conventional SAD method, a 1D POC method, and a method of processing stereo images of the present invention.

Finally, FIG. 22 shows comparison of accuracies of ranging between a conventional SAD method, a 1D POC method, and a method of processing stereo images of the present invention (hereinafter "the present method"). The ranging accuracy is indicated by the distance to an object to be ranged and the standard deviation of the results of ranging.

The results shown in FIG. 22 are calculated on the basis of stereo images of a vehicle as an object captured and ranged at different distances from stereo cameras shifted every 10 meter intervals. The criterion used for evaluation is the standard deviation of the results of ranging to eliminate error factors associated with the distortion correction of a lens and the collimation correction of the stereo cameras. In FIG. 22, methods with a small standard deviation of the results of ranging indicate high accuracy, where the standard deviation represents the dispersion of the results of ranging.

The standard deviation of the results of ranging is calculated using pixels, as sampling points, within a vehicle region visually extracted from pixels included in the captured stereo images. The estimation of sub-pixels according to the present method uses quadratic curve approximation that needs the least computational complexity. As indicated in FIG. 22, the POC method (▼) and the present method (■) have similar characteristics, and a smaller standard deviation than that of the SAD method (▲).

Figure 23:
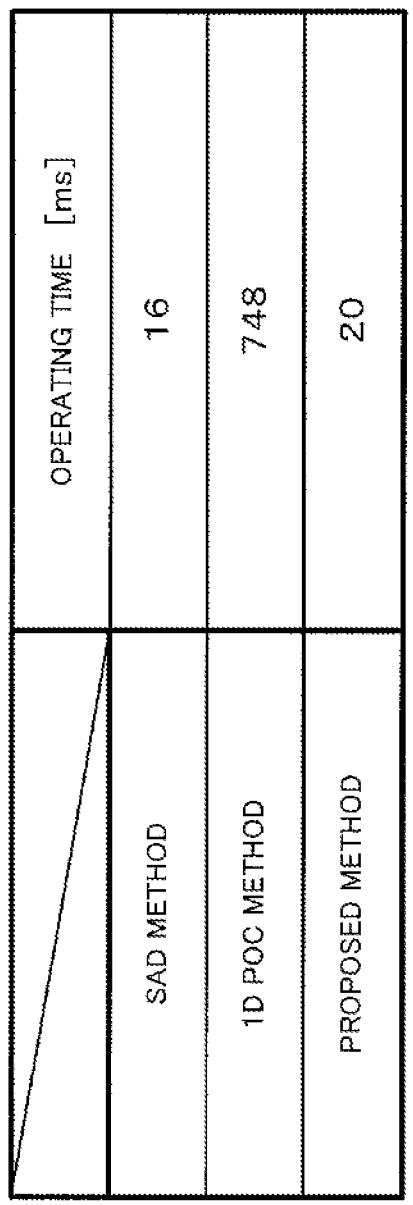
FIG. 23 shows comparison of the operating times of disparity calculations between the SAD method, the 1D POC method, and the method of processing stereo images according to the present invention.

FIG. 23 shows comparison of the operating times of disparity calculations between the SAD method, the 1D POC method, and the present method.

The results shown in FIG. 23 are the operation times necessary for one frame of a half VGA image (640×240) with a personal computer (3.33 GHz). The present method requires an operating time of about 1.25 times compared with the SAD method, while the 1D POC method requires an operating time of more than about 30 times compared with the present method.

As shown by the results in FIG. 22 and FIG. 23, the method of processing stereo images according to the present invention can achieve an operating time equivalent to the SAD method, and an accuracy of ranging equivalent to the 1D POC method.

(Other Embodiments)

(1) Although stereo images acquired by the stereo image acquiring section are directly inputted to the image matching section and the filtering section in each embodiment above, preprocessing prior to the input may be performed as follows.

That is, a collimation-correction section may be disposed upstream of the image matching section and the filtering section to perform a distortion correction process of the lens of the stereo image and a collimation-correction process to collimate the optical axes. Specifically, in the distortion correction process, an object that is a straight line in the real space is corrected so as to be displayed as a straight line in a camera image using calibration data prepared in advance. The collimation-correction process includes a coordinate transformation process for transforming coordinates such that the image of an object located at a constant distance in the direction of the optical axis of the camera has the same size at any position within the camera image, and an image shift process that collimates the optical axes of two cameras and shifts the camera images of an object located at an infinite distance such that the images are present at the same position. Here, the image shift process performs the collimation-correction after the coordinate transformation process; however, the present invention is not limited to this order. For example, the collimation-correction may be performed by the coordinate transformation at the same time as the distortion correction of the lens. In short, if both of the distortion correction of the lens and the correction of the position relationship of two cameras are available, the method therefor should not be limited.

The preprocessing may involve contrast correction for use in ordinary image processing or edge enhancement using a Laplacian filter. Since the contrast correction can match the dynamic range of variable brightness of the target image with that of the reference image, the image matching can be achieved more accurately. The edge enhancement using the Laplacian filter can also remove a DC component (i.e., the difference between the brightnesses of the target image and the reference image) resulting from a difference between individual cameras, and the image matching can be achieved more accurately.

In usual coordinate transformation or shift of an image, brightness data sampled at every pixel (i.e., at positions with integer values) is converted into brightness data at positions of real values. Such conversion may be achieved by an inter-linear method using linear interpolation or bicubic interpolation using the brightness data in the vicinity of a position to be converted.

(2) The stereo image processing apparatus described in each embodiment above may be provided with a matching error detection section for detecting the matching error at a pixel level based on the results of filtering. The matching error detection section determines the matching at a pixel level to be an error if the output from the filtering section is asymmetric (i.e., bilaterally asymmetric). Alternatively, the matching error detection section determines a matching error if the local minimum position of the SAD value and the peak position of the output from the filtering section are different at a pixel level (for example, if the output from the filtering section has no peak). This does not require a back-matching process and can thereby reduce the computational complexity.

(3) While the present invention is described with reference to hardware in the embodiments, the present invention may also be implemented using software associated with the hardware.

In addition, function blocks used in the description of the above embodiments are typically implemented by integrated circuits, i.e., LSIs. The integrated circuits may be implemented in discrete chips or in a single chip including part or all thereof. While the LSI is referred to herein as the integrated circuit, it may be referred to as an IC, a system LSI, a super LSI or an ultra LSI according to the degree of integration.

The means of integrating a circuit is not limited to the LSI, and may be implemented by a dedicated circuit or a general-purpose processor. A field programmable gate array (FPGA), which can be programmed after manufacturing the LSI, and a reconfigurable processor, which can reconfigure the connection and setting of circuit cells inside the LSI, may also be employed.

Furthermore, if an integrated circuit technology appears that uses an advanced semiconductor technology or a different technology derived therefrom instead of the LSI, the function blocks may also be integrated using the technology. For example, a biotechnology can also be employed.

The disclosure of Japanese Patent Application No. 2010-149425, filed on Jun. 30, 2010, including the specification, drawings and abstract, incorporated herein by reference in its entirety.

INDUSTRIAL APPLICABILITY

The stereo image processing apparatus and method of processing stereo images according to the present invention are useful for maintaining the process load at a level equivalent to the SAD method and for improving the calculation accuracy of disparity.

REFERENCE SIGNS LIST

100, 200, 300, 400, 500, 600 Stereo image processing apparatus
101 Stereo mage acquiring section
102, 502 Image matching section
103, 503 Filtering section
104 Peak position detecting section
201, 501 Data deletion section
301 High-frequency component removing section
401. Color image data deletion section
601 Cross-correlation section

The invention claimed is:

1. A stereo image processing apparatus comprising:
an acquiring section that acquires stereo images including a target image and a reference image;
a decimating section that decimates the target image and the reference image to create a decimated target image and a decimated reference image;
a first calculation section that calculates the amount of displacement in pixels between the decimated target image and the decimated reference image;
a filtering section that reverses a sequence of data consisting of brightness values in the decimated target image to calculate an inverted phase filter coefficient, and filters the decimated reference image using the calculated inverted phase filter coefficient to output the results of filtering; and
a second calculation section that detects a peak in the results of filtering outputted from the filtering section to calculate the amount of displacement in sub-pixels between the decimated target image and the decimated reference image.

2. The stereo image processing apparatus according to claim 1, further comprising an extraction section that is disposed upstream of the decimating section and extracts only low-frequency components through removal of high-frequency components from low- and high-frequency components included in signals of the target image and the reference image inputted to the decimating section to output the target image and the reference image with the high-frequency components removed to the decimating section.

3. The stereo image processing apparatus according to claim 1, wherein:
the target image and the reference image each include a plurality of channel images, and
the decimating section extracts a single channel image among the plurality of channel images from the target image and the reference image to create the decimated target image and the decimated reference image.

4. The stereo image processing apparatus according to claim 1, wherein:
the target image and the reference image each include a plurality of channel images, and
the decimating section combines the plurality of channel images to create a single composite channel image, and creates the decimated target image and the decimated reference image.

5. The stereo image processing apparatus according to claim 1, wherein:
the target image and the reference image each include a plurality of color pixel units;
the color pixel units each include four pixels of a red pixel, a first green pixel, a second green pixel, and a blue pixel;
the red pixel, the first green pixel, and the blue pixel constitute a first pixel group, and the second green pixel constitutes a second pixel group;
the decimating section creates a composite channel target image in the first pixel group of the target image to create the decimated target image including the composite channel target image and the target image of the second pixel group, and creates a composite channel reference image in the first pixel group of the reference image to create the decimated reference image including the composite channel reference image and the reference image in the second pixel group;
the first calculation section calculates the amount of the displacement in pixels on the basis of the composite channel target image and the composite channel reference image; and
the filtering section calculates a first inverted, phase filter coefficient and a second inverted phase filter coefficient on the basis of the composite channel target image and the target image of the second pixel group, and outputs the results of final filtering to the second calculation section, the results of final filtering being obtained by summing the results of first filtering and second filtering obtained by filtering the composite channel reference image using the first inverted phase filter coefficient and filtering the reference image in the second pixel group using the second inverted phase filter coefficient.

6. A method of processing stereo images comprising the steps of:
acquiring stereo images including a target image and a reference image;
decimating the target image and the reference image to create a decimated target image and a decimated reference image;
calculating the amount of displacement in pixels between the decimated target image and the decimated reference image;
reversing a sequence of data consisting of brightness values in the decimated target image to calculate an inverted phase filter coefficient;
filtering the decimated reference image using the calculated inverted phase filter coefficient; and
detecting a peak in the results of filtering to calculate the amount of displacement in sub-pixels between the decimated target image and the decimated reference image.

* * * * *